(12) United States Patent
Moores et al.

(10) Patent No.: US 7,539,143 B2
(45) Date of Patent: May 26, 2009

(54) NETWORK SWITCHING DEVICE INGRESS MEMORY SYSTEM

(75) Inventors: John D. Moores, Groton, MA (US); Donald P. Proulx, Dover, NH (US)

(73) Assignee: Netapp, Inc., Sunnyvale, CA (US)

( * ) Notice: Subject to any disclaimer, the term of this patent is extended or adjusted under 35 U.S.C. 154(b) by 826 days.

(21) Appl. No.: 10/915,127

(22) Filed: Aug. 10, 2004

(65) Prior Publication Data
US 2005/0073956 A1 Apr. 7, 2005

Related U.S. Application Data

(60) Provisional application No. 60/494,535, filed on Aug. 12, 2003, provisional application No. 60/494,190, filed on Aug. 11, 2003.

(51) Int. Cl.
*H04L 12/26* (2006.01)
(52) U.S. Cl. .............. 370/235.1; 370/389; 370/415
(58) Field of Classification Search ............ 370/389, 370/412, 413, 415
See application file for complete search history.

(56) References Cited

U.S. PATENT DOCUMENTS

| | | | | |
|---|---|---|---|---|
| 5,724,358 A * | 3/1998 | Headrick et al. | ............ | 370/418 |
| 5,748,612 A * | 5/1998 | Stoevhase et al. | ........... | 370/230 |
| 6,070,192 A | 5/2000 | Holt et al. | | |
| 6,219,805 B1 | 4/2001 | Jones et al. | | |
| 6,247,077 B1 | 6/2001 | Muller et al. | | |
| 6,330,601 B1 | 12/2001 | French et al. | | |
| 6,680,933 B1 | 1/2004 | Cheesman et al. | | |
| 6,765,871 B1 * | 7/2004 | Knobel et al. | ............... | 370/231 |
| 6,922,408 B2 * | 7/2005 | Bloch et al. | ............... | 370/389 |
| 7,023,840 B2 | 4/2006 | Golla et al. | | |
| 7,027,457 B1 | 4/2006 | Chiussi et al. | | |
| 7,304,987 B1 * | 12/2007 | James et al. | ................ | 370/360 |
| 7,307,954 B1 * | 12/2007 | Strandberg et al. | ......... | 370/235 |
| 7,327,680 B1 * | 2/2008 | Kloth | ........................ | 370/235 |
| 7,349,334 B2 * | 3/2008 | Rider | ........................ | 370/229 |
| 7,408,875 B2 * | 8/2008 | Garmire et al. | ............. | 370/229 |
| 2002/0003639 A1 | 1/2002 | Arecco et al. | | |
| 2002/0085578 A1 * | 7/2002 | Dell et al. | ................... | 370/422 |
| 2003/0048792 A1 | 3/2003 | Xu et al. | | |
| 2003/0112818 A1 | 6/2003 | Schmidt | | |
| 2003/0126223 A1 * | 7/2003 | Jenne et al. | ................. | 709/212 |
| 2003/0135642 A1 | 7/2003 | Benedetto et al. | | |
| 2003/0137941 A1 | 7/2003 | Kaushik et al. | | |
| 2003/0161303 A1 | 8/2003 | Mehrvar et al. | | |
| 2003/0189935 A1 * | 10/2003 | Warden et al. | ......... | 370/395.21 |
| 2004/0013124 A1 * | 1/2004 | Peebles et al. | .............. | 370/412 |
| 2004/0037277 A1 * | 2/2004 | Mathews et al. | ............ | 370/386 |
| 2004/0139167 A1 | 7/2004 | Edsall et al. | | |
| 2005/0089054 A1 | 4/2005 | Ciancaglini et al. | | |

OTHER PUBLICATIONS

Sandial Systems, Inc., Requistion for Purchase No. 312039. Aug. 12, 2002, p. 1.

(Continued)

*Primary Examiner*—Hassan Kizou
*Assistant Examiner*—Jeffrey M Rutkowski
(74) *Attorney, Agent, or Firm*—Perkins Coie LLP

(57) ABSTRACT

A switching device includes an ingress memory system having a VOQ-based design to provide an infrastructure for enabling fine-grained QoS and SLAs.

23 Claims, 20 Drawing Sheets

OTHER PUBLICATIONS

Muriel Medard, et al., "A Network Management Architecture for Robust Packing Routing in Mesh Optical Access Networks", LEOS Summer Topical Meetings, Jul. 2000, 35 pages.

"A NovelMedium Access Control Protocol for WDM-Based LAN's and Access Networks Using a Master/Slave Scheduler;" Modiano, Eytan and Barry, Richard; 2000 IEEE; Journal of Lightwave Technology, vol. 16, No. 4, Apr. 2000; pp. 461-468.

* cited by examiner

NETWORK SWITCHING DEVICE INGRESS MEMORY SYSTEM

CROSS-REFERENCE TO RELATED APPLICATIONS

The present application claims the benefit of U.S. Provisional Patent Application No. 60/494,535, filed on Aug. 12, 2003 and U.S. Provisional Patent Application No. 60/494,190, filed on Aug. 11, 2003, both of which are incorporated herein by reference.

STATEMENTS REGARDING FEDERALLY SPONSORED RESEARCH

Not applicable.

FIELD OF THE INVENTION

The present invention relates generally to data and communications networking. In particular, it relates to providing quality of service capabilities and services in networks.

BACKGROUND OF THE INVENTION

As is known in the art, Quality of Service (QoS) is a general heading that can include any of several different features in a network. One such feature is to provide a guarantee of a minimum allocated bandwidth through a network for a call or a set of calls. A call is defined as communication from one end node to another end node. A call may consist of one or more connections, where a connection is defined as communication from the ingress of one port within a switching device to the egress of a port, within the same switching device. A "flow" is defined as a one distinguishable communication flow from one end node to another end node. A call consists of one or more flows. For example, two end nodes may be communicating according to two different applications, e.g. a database transaction application and a data replication application. The two end nodes have one established call in each direction, and each call consists of two distinguishable flows. The terms "call," "connection," and "flow" typically imply connection-oriented service, where resources are dedicated for periods of time to the communication between the two communicating entities, but in the description of the present invention, the terms are used more broadly, without requiring connection-orientation. Another QoS feature is to provide a maximum bandwidth that may be used by a connection or a set of connections. Yet another is policing, whereby a switch, router, or other network appliance ensures that the service level agreement (SLA) for each connection is not violated by the sources, and the term "policing" usually refers to dropping frames in order to maintain SLAs.

Flow control mechanisms may also be used for SLA maintenance. QoS may also include guarantees that the latency for frames will not exceed a threshold. QoS may also include isochrony guarantees, meaning that frames can be expected to arrive at the destination at regular (to within some tolerance) intervals, at least if the frames are transmitted by the source at regular intervals. End users typically prefer absolute QoS guarantees to statistical guarantees. For example, an end user may prefer to be ensured that a connection will always be granted a certain minimum bandwidth or more, rather than being guaranteed that the connection will be granted at least the desired minimum bandwidth 95% of the time that the switch is operational.

Queuing and scheduling are important for enabling QoS. Some systems funnel all incoming frames into a single first-in first-out (FIFO) queue, but this can result in blocking if the frame at the head of the queue cannot be serviced. Output queuing is often considered the ideal, and is used as a reference for performance of other methods. With output queuing, each frame is immediately forwarded from the input port (ingress) to the appropriate output port (egress). Each output port must have sufficient bandwidth to handle frames being simultaneously forwarded from multiple port ingresses. The output port must also have sufficient buffering and/or adequate flow control to handle offered loads greater than unity. Switches designed to switch high-speed traffic typically cannot be designed using output queuing because of the memory bandwidth requirements at the egress ports.

A popular alternative is virtual output queuing. Each ingress has a set of virtual output queues (VOQs). As frames come into the ingress, they are inspected and fed into the appropriate VOQ. A VOQ might be assigned to each egress. Multiple VOQs could be assigned to each egress to further differentiate traffic flows. The switching fabric internal to the switch can be scheduled at regular intervals to define a set of nonconflicting ingress-egress pairs, enabling frames to move from ingress to egress. The scheduling can be used to ensure that the rate of frame transmission to the egress does not exceed the nominal capacity of the egress. Many scheduling/arbitration algorithms in use in commercial products, and described in the open literature, are unsuitable for ensuring absolute QoS guarantees.

If an ingress has multiple queues per egress, a queuing discipline (scheduling at the port ingress, or for a group of ports, rather than general scheduling of the entire internal switch fabric) may also be needed in order to select from which queue the ingress should send to the egress at a particular time. Many systems implemented in commercial products and described in the literature are unsuitable for ensuring absolute QoS guarantees.

Fibre Channel (FC) has been standardized by the American National Standards Institute (ANSI). FC is defined by Technical Committee T11, the committee within the InterNational Committee for Information Technology Standards (INCITS) responsible for device level interfaces. INCITS is accredited by, and operates under rules approved by the American National Standards Institute (ANSI). FC is a serial data transfer architecture that has been widely adopted in storage area networks (SANs). FC is well suited to storage environments because of the efficiency and reliability with which it transports blocks of data suited to storage environments.

Within the FC architecture, three topologies are defined: point-to-point, arbitrated loop (FC_AL), and fabric. Point-to-point is a direct, dedicated link between two end nodes (N_Ports). Because there are no shared resources, no sophisticated queuing or scheduling is required.

FC_AL is a shared topology, where multiple devices are attached to a loop and each must arbitrate for access at a given time. FC_AL defines arbitration mechanisms and allows some flexibility. Some additional QoS could be overlaid on FC_AL. FC_AL is commonly used within large storage arrays.

The fabric topology is general, and supports switches that can interconnect multiple devices, with multiple flows sending frames at the same time. Fabric also supports meshes of switches. Because of its generality, most of the examples in the descriptions of the preferred embodiments of the present invention assume fabric topology. However, those skilled in the art will be able to apply some of the methods to FC_AL as well.

FC offers multiple classes of service. These include:

Class 1—connection-oriented, dedicated path

Class 2—acknowledged connectionless

Class 3—unacknowledged connectionless

Class 4—connection-oriented, fractional bandwidth, requiring hardware modifications.

Fibre Channel Class 1 service dedicates an entire path to one call in one direction. While this ensures that the call receives all of the resources available, it can be inefficient not to share some of the bandwidth on a path with other calls. Thus, Class 1 is not often used.

Class 4 service is a more efficient alternative to Class 1, in that it enables dedicated fractional bandwidth service. Calls are guaranteed a fixed amount of bandwidth on each leg of the communication path from source to destination, and this bandwidth can be a fraction of, rather than the entire bandwidth of each segment. The drawback of Class 4 is that it requires changes to both the switch/router and host bus adapter (HBA) hardware. The industry has not adopted Class 4. Most FC users use Class 3 service (described below). Some use Class 2 service (described below). The unavailability of Class 4 HBAs and switches eliminated Class 4 from consideration for most customers. Although Class 4 would provide a solid infrastructure for QoS, it is not a practical starting point for a switch designer. Therefore, the description of the present invention focuses on the overlay of QoS onto Class 3 service. Those skilled in the art will be able to generalize the methods herein to other classes of service.

Class 3 service is in a sense the simplest: unacknowledged connectionless service. A transmitter transmits data basically whenever it wishes, as permitted by FC flow control, and without any feedback from the network or the receiver indicating the success of the transmission.

Class 2 service is similar to Class 3 in being connectionless, but Class 2 is an acknowledged service. That is, the recipient sends small messages back to the transmitter indicating the success of the receipt of data frames, so as to improve reliability.

While FC offers several different classes of service, there are users who would prefer more options for quality of service. In particular, there are customers who would use the fractional bandwidth capabilities of Class 4, e.g. if Class 4 hardware were commercially available or if the use of Class 4 service did not require a major hardware replacement. Users have expressed a need to be able to allocate a minimum amount of bandwidth to a particular call, or to be able to enforce a maximum bandwidth to be used by a call or by a set of calls in Fibre Channel based networks. Frame drops (loss of frames) is generally included under the heading of "QoS" but Fibre Channel flow control was designed to avoid frame drops due to buffer overflow and most Fibre Channel network users will not tolerate frame drops. Other QoS parameters can include latency and variance or isochrony, which are important to certain applications, including some replication and video distribution applications.

Overprovisioning, which is network design ensuring that the nominal fabric bandwidth exceeds the anticipated sustained load, is common practice in Fibre Channel SAN design. Designers often assume that overprovisioning will increase the probability that applications will receive the bandwidth required. However, typical deployments involve "many-to-one" scenarios, where multiple hosts or servers send or receive data to or from a single storage port. Having excess switch bandwidth may not offer any benefits because congestion at the storage ports (and attached switch ports) cause performance problems. A switch that can maintain SLAs under congestion may be more useful effective, and may be less costly than overprovisioning.

Fibre Channel uses a flow control mechanism whereby a device port sends "buffer-to-buffer credits" by means of R_RDY primitive sequences to the port at the other end of the link. If a device port has ingress buffer space adequate to hold M maximum-length FC frames, then that device will send up to M R_RDYs to the attached device. For each R_RDY received by the attached device, it is permitted to send a frame. The attached device counts outstanding R_RDYs, and if the number drops to zero, the attached device must stop sending frames to the port until more R_RDYs are sent by that port.

Ethernet is another standard used for networking. Ethernet is ubiquitous in local area network (LAN) environments, and there are efforts in standards bodies and in the commercial realm to grow the sphere of influence of Ethernet to metropolitan, access, and storage area networks. The widespread internet protocol (IP) is typically delivered using Ethernet. In the SAN arena, iSCSI is an emerging protocol that utilizes both IP and Ethernet. A switch that can pass Ethernet traffic can also pass iSCSI traffic, but generally cannot provide the protocol translation for stripping off the Ethernet, IP, and iSCSI headers to interface directly to a SCSI device. Ethernet does not provide QoS intrinsically. The methods taught herein enable QoS on an Ethernet network.

Although Ethernet does not specify a flow control that is exactly analogous to Fibre Channel buffer-to-buffer credit mechanism, the PAUSE frame mechanism bears significant similarities and can be used in a similar manner to avoid buffer overruns.

BRIEF DESCRIPTION OF PRIOR ART

The Fibre Channel standard does not define a mechanism to provide connection-oriented fractional bandwidth service, or a variety of other connection-oriented services, using only hardware components (switches, routers, and HBAs) that are compatible with Class 2 and Class 3 service but not with Class 4 service.

There have been attempts to provide QoS in Ethernet-based networks using the Internet Protocol (IP). An example is Differentiated Services (DiffServ), which provides priority levels for different frames, but does not establish true connections, nor true bandwidth guarantees in general, and certainly not isochrony guarantees. A prior IP development, Integrated Services (IntServ) has better QoS capabilities than DiffServ, but was found not to scale well to internet-scale networks and has not been widely adopted. Such massive scalability is not required for most SAN deployments, and therefore IntServ-like features may be better suited to SAN environments. Recent efforts to merge features from DiffServ and MPLS-TE may also provide attractive IP QoS alternatives suitable for some consumers. The methods described herein provide alternatives that are able to ensure QoS guarantees and that are well-suited to SAN environments.

Many network switch ingress memory systems provide multiple queues, and many are based on linked list data structures. Many of these systems have fixed queue sizes or numbers of queues. Some more recent designs enable dynamic sizing of queues, but typically the sum of the thresholds (maximum queue depths) cannot exceed the size of the memory system. The number of queues may be limited as well.

U.S. Pat. No. 6,061,358, "Data Communication System Utilizing a Scalable, Non-Blocking, High Bandwidth Central Memory Controller and Method" describes an ingress memory system. However, this system is inherently centralized and the queue sizes are not dynamically adjustable.

Published U.S. Patent Application No. 20030189935, "Systems and methods for providing quality of service (QoS) in an environment that does not normally support QoS features" describes a broader switching system with goals similar to the present invention. The NGS application describes the use of virtual output queues and buffering for the purpose of providing QoS, ideas that are well-established in the open literature dating well before the NGS application. The present invention is specific to an ingress memory system design, and goes into far more detail on the implementation of the memory system. The present invention is not described in the open literature. At a higher level, the present invention is designed to be a subsystem in a greater switching system. Even the higher-level switching system for which the present invention is designed can be distinguished from the switching system described in the NGS application. First, the present invention is more readily scalable to large switch designs, applicable to chassis-based switching devices and distributed switching systems, whereas the NGS disclosure applies to small scale switching devices. The present invention describes mechanisms for communication scheduling/arbitration information and queue feedback between centralized or distributed scheduling/arbitration engines and the ports. The present invention uses a different scheduling/arbitration mechanism. The present invention enables a switch administrator to define policies and policy groups for administering QoS and reporting statistics in convenient groupings.

SUMMARY OF THE INVENTION

The present invention provides ingress memory systems. These ingress memory systems are designed for use in devices with switching capabilities. An ingress memory system services one or more ports of the switching device. The memory system is capable of differentiating incoming frames and storing them temporarily in virtual output queues (VOQs), for example. The flexible VOQ-based design of the class of ingress memory systems described herein provides an infrastructure for enabling fine-grained QoS and SLAs.

In one embodiment, the VOQs for a given ingress can be assigned to specific egress interfaces of the switching device or based on other classification criteria. The VOQs may be statically assigned, or dynamically assigned as needed. Maximum VOQ depths are defined, but physical memory need not be dedicated to the particular VOQ until needed, which greatly improves the efficiency of ingress memory system utilization, reducing the total amount of ingress memory required in the design.

In one aspect of the invention, the memory system design of he present invention couples the Fibre Channel flow control buffer-to-buffer credit (BB credit) memory with this set of dynamic virtual output queues. Any fraction of the ingress physical memory can be associated with the BB credits for the port. However, the BB credit memory is not physically distinct from the VOQ memory. The memory system keeps track of the remaining memory space available in the "free queue." However, the memory system also keeps track of which specific VOQs have drawn from the BB credit pool, meaning that the memory system is actually assigning more memory to that VOQ than the nominal maximum depth of that VOQ. BB credits that are associated with a particular VOQ exceeding its maximum number of buffers threshold are termed "queue credits." It is also possible for the free queue to be sufficiently low, below its minimum number of buffers threshold, that BB credits must be decremented even if a VOQ is not exceeding its maximum threshold. These BB credits are termed "port credits." Distinguishing port and queue credits is useful, e.g. when it is necessary to flush a VOQ and relinquish the correct number of BB credits.

BRIEF DESCRIPTION OF THE DRAWINGS

The foregoing features of this invention, as well as the invention itself, may be more fully understood from the following description of the drawings in which.

DETAILED DESCRIPTION OF THE INVENTION

Figure 1:
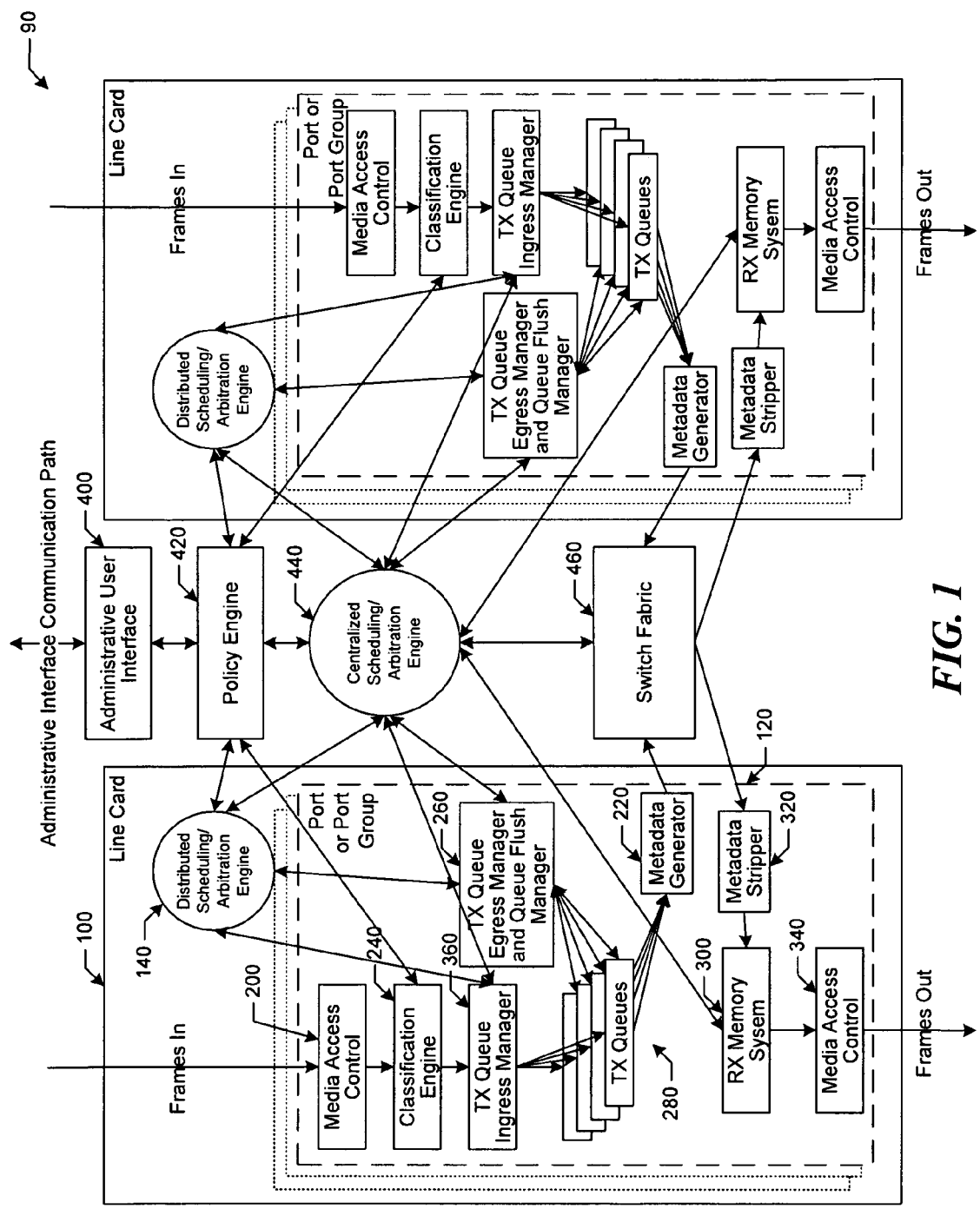
FIG. 1 is a general block diagram of a switching device comprising one or more switching fabrics and one or more line cards.

In this invention, data network switches and routers have the capability of complying with the Fibre Channel standard, interfacing with host bus adapters (HBAs) that are compliant with FC Classes 2 and 3 but not Class 4, yet which can provide connection-oriented service, including fractional bandwidth guarantees, variance guarantees, and other quality of service capabilities that are unavailable using traditional FC Class 2 and 3 services. Furthermore, QoS may be provided for other protocols such as Ethernet. U.S. patent application Ser. No. 10/815,106, entitled, "METHODS AND APPARATUS FOR PROVISIONING CONNECTION ORIENTED, QoS CAPABILITIES AND SERVICES," filed on even date herewith, is incorporated herein by reference.

In one aspect of the invention, a method includes creation of frame metadata describing the QoS parameters and possibly other parameters for each frame. This metadata may be incorporated into an encapsulation frame that encapsulates the incoming frames or portions of frames. The encapsulation frame is used internal to the switch only, or may be transmitted between multiple switches, but is stripped off the frames before sending the frames to HBAs or NICs (network interface cards) or switches or appliances that are not aware of this encapsulation scheme. In other embodiments, this frame metadata may be transmitted through an out of band (not in the data path) channel or in-band (in the data path) in separate cells or frames that are only passed to devices that understand the meaning of these messages.

Subsystems within a switch or router that enable QoS include but are not limited to the following five subsystems: (1) mechanisms for queuing Fibre Channel (or other protocol) frames based upon such parameters as destination physical port, destination protocol (e.g. TCP) port, destination address, destination logical unit number (LUN), source physical port, source protocol (e.g. TCP) port, source address, source logical unit number (LUN) or a combination of any these or other attributes; (2) mechanisms for classifying Fibre Channel (or other protocol) frames and moving them into the appropriate queues; (3) methods for generating encapsulating frames or separate cells or frames that carry frame metadata that is used to maintain QoS, and methods for removal of said metadata, (4) scheduling and/or arbitration mechanisms, which may be centralized, distributed, or both, for servicing the queues and ensuring that QoS parameters are met, and (5) a policy engine with a user interface that allows the administrator to define service levels. These subsystems and others needed for one embodiment are depicted in a block diagram in FIG. 1, described in more detail below. Additional subsystems may include feedback mechanisms to or from the ingress or egress memory systems, e.g. for improving the adaptability of the scheduling or arbitration. It is understood that while feedback from the egress memory systems is not explicitly depicted in FIG. 1, but is recommended in preferred embodiments.

FIG. 1 is a block diagram of an exemplary QoS-capable protocol-agnostic switch/router 90 in accordance with the present invention. Objects 400, 420, 440, 460, which are described below, might reside as dedicated hardware in the switch or router, or could be placed on printed circuit boards (PCBs) or the like, as removable supervisory, switch, or combination supervisory/switching modules. Other objects are depicted as residing on line cards, which are typically removable modules housing PCBs. The switch or router might contain any number of supervisory, switching, supervisory/switching, or line cards. Each line card might support any number of ports. Ports are interfaces to devices external to the switch or router, such as computers (including but not limited to hosts, servers, or workstations), other switches or routers or network-attached storage heads which may or may not be QoS-aware, appliances (including but not limited to virtualization appliances, protocol gateways, protocol encapsulation appliances, security appliances, repeaters, regenerators, amplifiers, or media conversion appliances), sensors, controllers, test or measurement equipment, or storage devices (including but not limited to tape devices, tape arrays, optical media devices, optical media jukeboxes, disks, disk arrays, switched disk arrays, JBODs, RAID arrays, holographic memory systems, or solid state memory devices).

Figure 2:
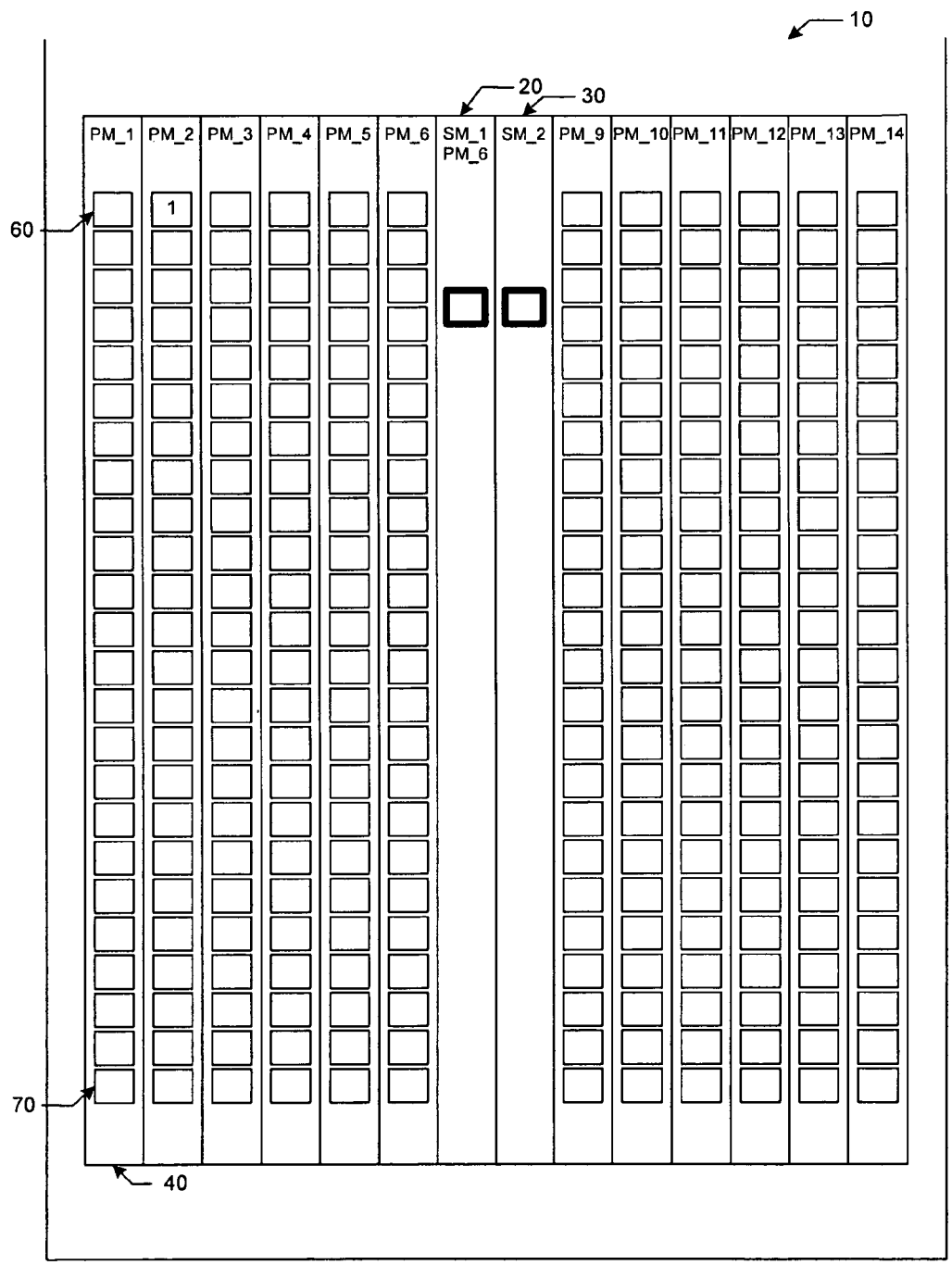
FIG. 2 is a depiction of one embodiment of the front panel of a chassis-based switching device with two switching/supervisory line cards and with twelve I/O line cards, each with 24 ports.

Referring now to FIG. 2, the physical switch/router could be housed in a chassis-style housing, that is roughly parallelepiped-shaped. FIG. 2 depicts a possible front view of such a chassis. The chassis, 10, can hold several cards, such as the line cards (PMs), 40, and the switching, supervisory, or switching/supervisory cards (SMs), 20, 30. The line cards have several front-panel ports, 60, 70, for frames to enter and depart the switch/router. The SMs 20, 30 may have one or more front-panel ports for administrative access, not typically used for passing data frames.

Referring again to FIG. 1, the switch/router 90 is shown as having both a centralized scheduling/arbitration engine 440 and distributed scheduling/arbitration engines 140. In practice, either centralized or distributed scheduling/arbitration engines would be required, but it is not necessary for the switch or router 90 to include both. The distributed engines are depicted as residing on each line card. However, switches could be designed with multiple distributed scheduling/arbitration engines on each line card, possibly one engine per port.

For simplicity and clarity, the switch/router 90 is shown with single points of failure. That is, if certain of the objects depicted in the figure were to fail in an operating switch or router, customer data traversing the switch/router could be compromised. However, those skilled in the art will be able to readily design redundant switches or routers based on the principles taught here, in order to provide superior network availability.

To clarify the roles of each of the components in FIG. 1, we describe the flow of control and data in the switch. It is understood the description will focus on the functions and operations relating to the provisioning of QoS. Certain functions and operations well known to one of ordinary skill in the art will not be described since they are known and have little or no bearing on the invention.

An administrator for the switch communicates with the Administrative User Interface, 400, in order to establish QoS parameters and policies. For example, the administrator might establish that any data path communications from a first port to a second port on the switch/router will be guaranteed a certain minimum bandwidth, will not be permitted to exceed a certain maximum bandwidth, will or will not tolerate the intentional dropping of frames to preserve QoS, will be guaranteed some maximum latency, and will be guaranteed some specific degree of isochrony (variance). The administrator might have even finer granularity and be able to specify QoS attributes of different flows from the first port to the second port, for example based upon which software application is generating the data, or based on the global source and destination addresses (as opposed to the local switch ports) of the frames.

The administrative user interface, 400, communicates this information in a format usable by the Policy Engine, 420. The Policy Engine establishes, maintains, edits, and deletes QoS-related and other policies for connections through the switch.

The Policy Engine, 420, communicates with the Scheduling/Arbitration Engine(s), 440 and/or 140, which in turn determine(s) which flows may access the switch fabric, 460, at which times and for how long. The switch fabric may be synchronous or asynchronous, and access to the switch fabric may be granted on a per-bit, byte, word, cell, frame, packet, time slice, or other time unit.

The flow of the user frames from the attached devices such as computers, storage devices and other devices, is now described. The frames flow into a port on the switch/router. A media access control (MAC) device, 200, performs certain protocol-specific processing on the incoming frames. In some embodiments, the MAC is a Fibre Channel controller. After passing through the MAC 200, the frames are processed by a Classification Engine, 240, which makes decisions as to which TX (transmit) virtual output queue, 280, associated with this ingress an incoming frame is to be routed. The TX Queue Ingress Manager, 360, assigns physical memory and updates tables and registers as described in detail below.

Each port has a set of TX virtual output queues, 280, used to differentiate connections/flows through the switch/router in accordance with the well-known virtual output queue (VOQ) model. An advantage of the use of multiple TX queues is that the scheduler/arbiter, 140, 440, can draw frames from different queues, 280, independently, whereas if a single TX FIFO (first-in, first-out) queue were used, frames would have to be serviced by the scheduler/arbiter in order, which would not permit QoS guarantees. If multiple TX queues, 280, are assigned to an individual port ingress, then the TX queues can be used to differentiate different local destination ports, different global source or destination addresses, different classes of service, different applications, etc. After a frame is placed in a TX queue, 280, it awaits servicing into the switch fabric, 460, as dictated by the scheduling/arbitration engine(s), 140, 440.

Frames in a VOQ need not be sent separately, but may be combined into one time slice, the fixed time increment used in the switching fabric, if the frames are f short enough duration. Furthermore, segmentation may be used to divide a frame so that a leading portion of the frame is transmitted in one time slice and a trailing portion of the frame is transmitted during a different time slice. If multiple frames or partial frames are combined into a single time slice, they may be separated by an interframe gap (IFG) or other separator. In a preferred embodiment, no IFG or separator is used between frames or partial frames because the reassembly function preceding the egress is able to distinguish the individual frames and partial frames and reinsert any IFG required by the communication protocol.

When a VOQ is to be serviced in the switching fabric during a particular time slice, the set of frames and/or partial frames to be transmitted during said time slice passes through the Metadata Generator, 220, before passing into the Switch Fabric, 460. The Metadata Generator generates an encapsulating frame around the incoming set of frames and/or partial frames, or appends a header or trailer or inserts a shim into the incoming frame, or generates a separate frame or cell to be sent in-band or out-of-band, or performs any combination of these functions. The purpose of this metadata is for use within the switch/router for ensuring QoS. The metadata might include fields such as global source address, local source port ID, source queue ID, global destination address, local destination port ID, destination queue ID, underlying protocol ID, application ID, flow ID, frame drop classification, or priority. In a preferred embodiment, the Metadata Generator, 220, generates an encapsulation frame, surrounding the set of frames and/or partial frames to be sent during a time slice.

Figure 10:
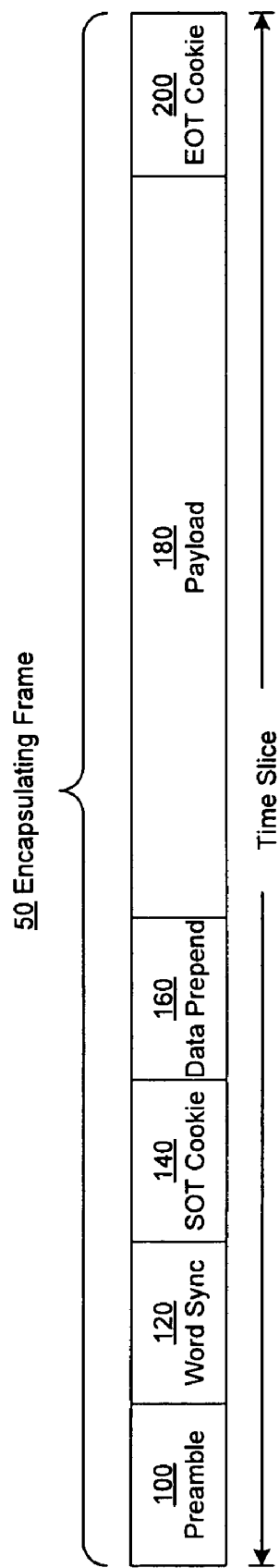
FIG. 10 is a diagram of an exemplary encapsulation frame.

Referring now to FIG. 10, a preferred embodiment of an encapsulating frame, 50, generated by a Metadata Generator, 220, is depicted. Frames and/or partial frames stored in a VOQ to be transferred in a time slice are inserted into the Payload field, 180, and encapsulated by fields 100, 120, 140, 160, and 200. Field 100 is a Preamble, or bit synchronization pattern, used to re-align destination node's Clock Recovery Unit (CRU), following a period of frequency and phase discontinuity seen at an egress, e.g. when the crossbar switches a different ingress to send to said egress. Field 120 is a Word Sync, or word alignment pattern containing "Commas" used to facilitate transmission word alignment, where a word is a 4-byte sequence. In a preferred embodiment, the Word Sync pattern consists of four /BC/50 patterns (12 Idles). Field 140 is a Start-of-Transfer (SOT) Cookie. In a preferred embodiment, the SOT Cookie is a unique 8-byte data pattern used to identify the valid start of a Transfer of an encapsulating frame in a time slice. In a preferred embodiment, the SOT Cookie Pattern is: xAAAA_FFFF_0000_5555. One benefit of using a SOT Cookie is that transceiver noise can randomly generate valid SOF (start-of-frame) delimiters defined by the communication protocol, e.g. Fibre Channel, and the SOT Cookie reduces the probability of an egress misinterpreting time slice or frame boundaries. Longer SOT Cookies offer greater protection. Field 160 is the Data Prepend, which contains information such as source and destination address, or other identifying information about the call, flow, or connection. In a preferred embodiment, the data prepend is four bytes in length and comprises a two-byte source address concatenated to a two-byte destination address. Field 200 is the End-of-Transfer (EOT) Cookie. This field is useful for delineating time slices, marking the termination of the transfer in one time slice. This delineation is useful when segmentation and reassembly are used, and a partial frame is at the tail of the payload field, 180. In a preferred embodiment, the EOT Cookie consists of two concatenated K28.5 comma characters.

In a preferred embodiment, each of the fields in the encapsulating frame, 50, is programmable. In a preferred embodiment, the duration of a time slice is equal to the duration of an encapsulating frame that can carry a maximum-length frame of the communication protocol, e.g. a 2148B Fibre Channel frame, in the Payload, 180, field of the encapsulating frame.

Referring again to FIG. 1, after passing through the Switch Fabric, 460, encapsulation frames travel on to the local destination port, 120, where the metadata is stripped off in the Metadata Stripper, 320, and the frame is fed into that port's RX memory system, 300. The RX memory system, 300, could be as simple as a FIFO with rate matching, or could be partitioned into e.g. per flow or per source port regions. The metadata is removed from the frame in the Metadata Removal unit, 320, if the device attached to the port is not aware of the QoS mechanisms used in this switch. The metadata may or may not be removed if the attached device is aware of these QoS mechanisms. The frame then passes through a MAC, 340, and on to the attached device.

In the preceding, the flow of protocol frames through the switch/routing device was described. There are additional functions. The TX Queue Ingress Manager, 360, allocates physical memory and updates registers, tables, and counters as frames are added to the TX memory system. The TX Queue Egress Manager and Queue Flush Manager, 260, perform two sets of functions. The TX Queue Egress Manager deallocates physical memory and updates registers, tables, and counters as frames are removed from the TX memory system. The Queue Flush Manager deletes the contents of a VOQ, deallocating the physical memory and updating registers, tables, and counters. The specific functions of preferred embodiments of the TX Queue Ingress Manager, 360, and the TX Queue Egress Manager and Queue Flush Manager, 260 are described below.

Figure 3A:
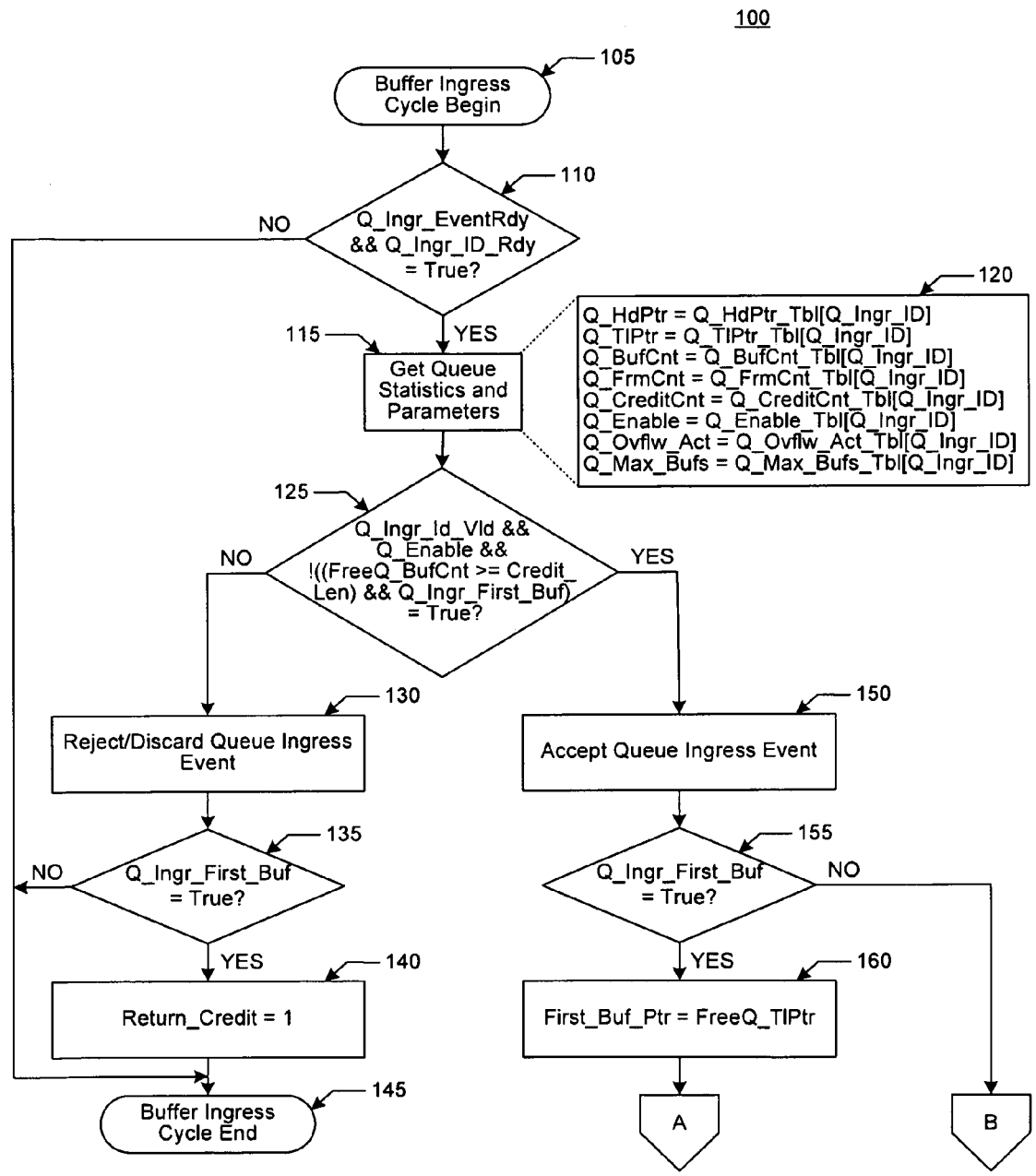
FIGS. 3A-3C provide a flow chart of a buffer ingress cycle, in which a frame enters an ingress memory system and various counters and pointers are updated if the frame is accepted.
Figure 3B:
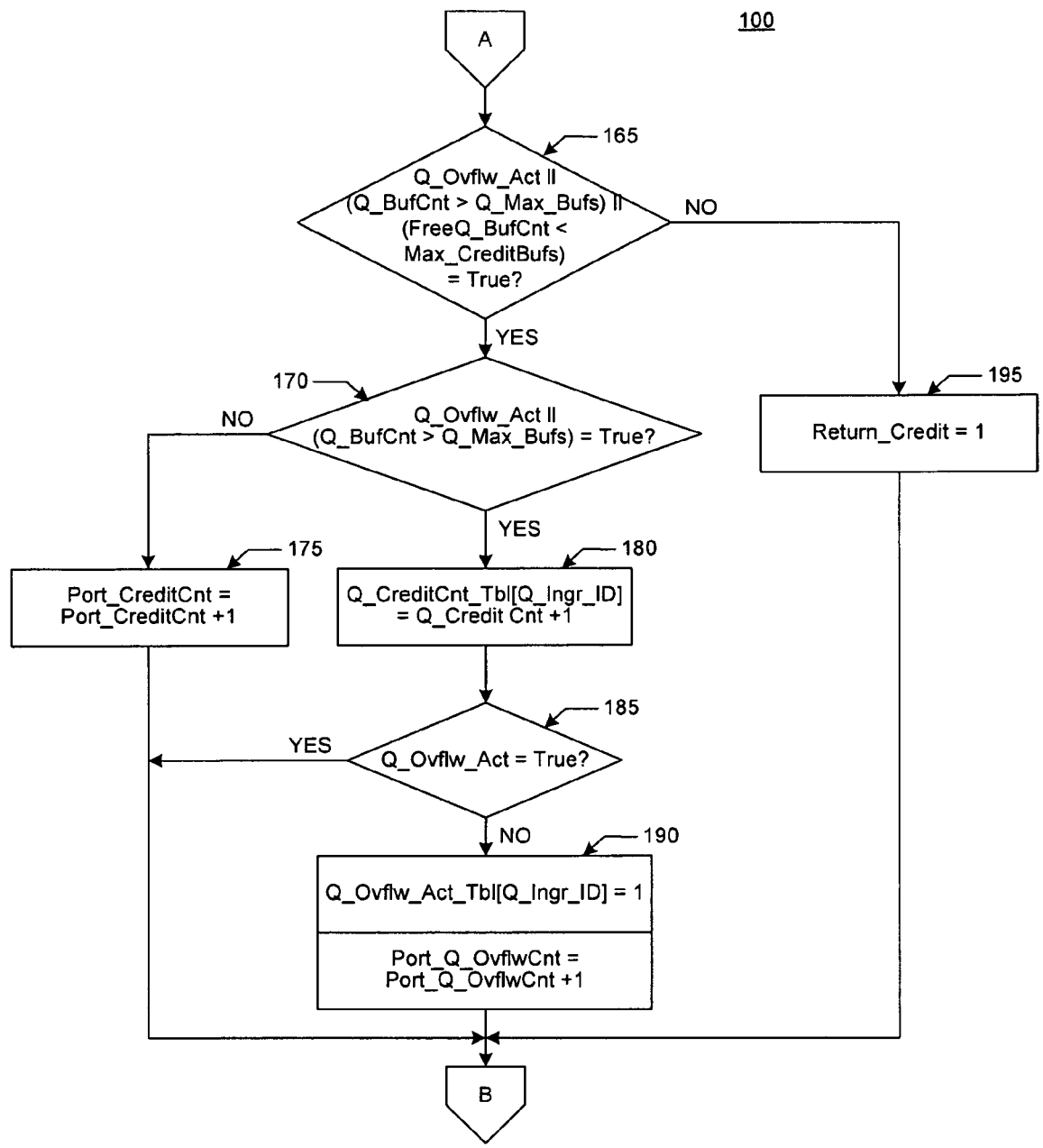
Figure 3C:
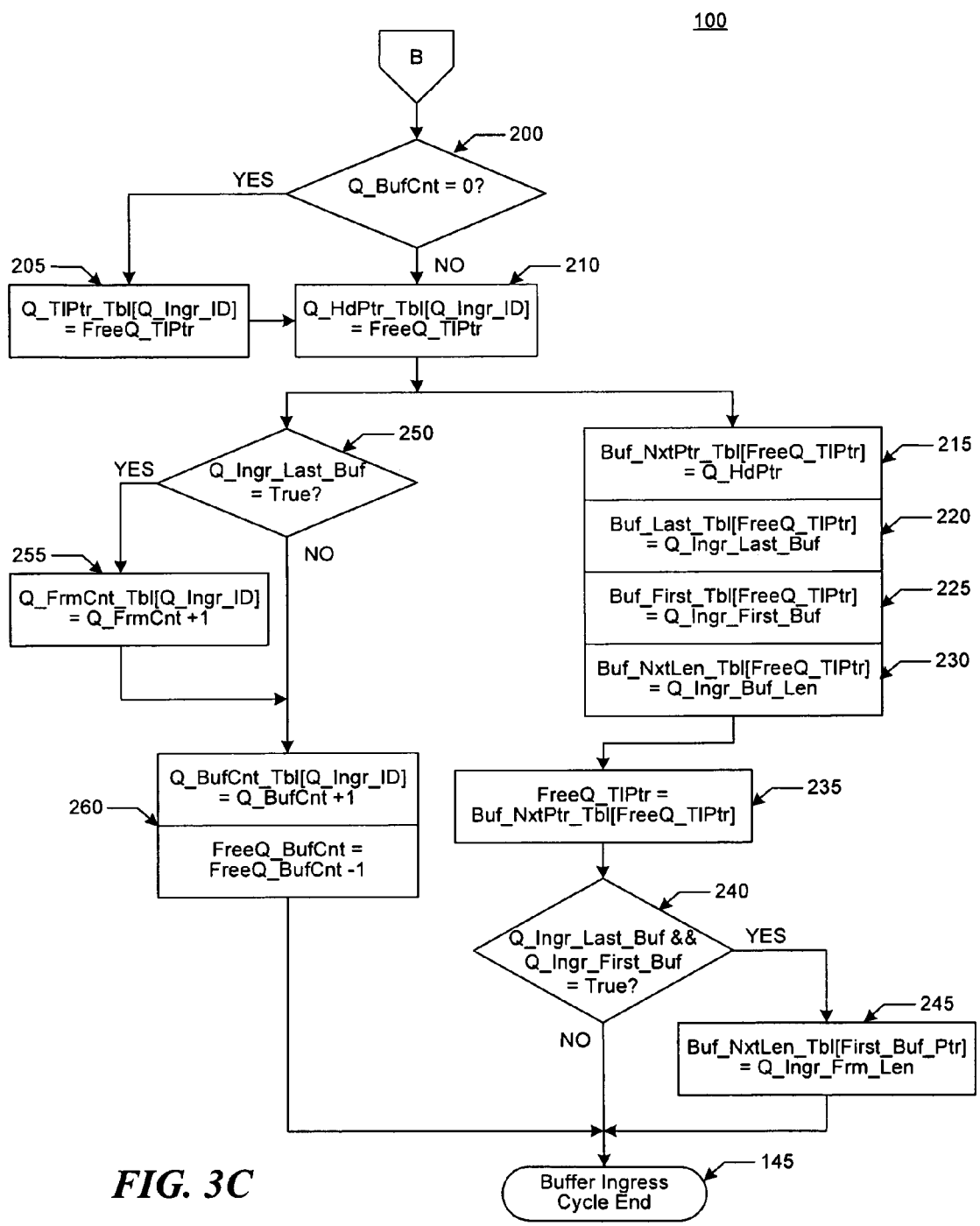

FIGS. 3A, 3B and 3C combine to form a single flow chart depicting the ingress buffer cycle 100. The flow chart, 100, is constructed in such a way as to indicate the sequence of events in such a way that one skilled in the art can implement an embodiment with minimal risk of timing or contention problems. Next, we describe the sequence of events in the flowchart, 100, starting from Buffer Ingress Begin, 105. The first decision process, 110, checks to see if Q_Ingr_Event_Rdy and Q_Ingr_ID_RDY are both TRUE. Q_Ingr_Event_Rdy is a logical variable indicating whether at least one buffer of data or an end-of-frame marker (EOF) is present and ready to be delivered into the ingress memory system. Q_Ingr_ID_RDY is a logical variable indicating whether a Queue identifier (ID) has been assigned to this data or EOF.

If the first decision process, 110, result is False, the system follows the NO path to Buffer Ingress Cycle End, 145, ending the buffer ingress cycle. Otherwise, the YES path is followed to the first action, 115, Get Queue Statistics and Parameters. In this action, the information and parameters specified in the expansion block, 120, are copied into temporary variables. The temporary variables are not subject to modification subsequent to action 115 during a single buffer ingress cycle. The expansion block, 120, provides names for the variables, and these variables are described below as they appear in the remainder of the flow chart, 100.

Referring specifically to FIG. 3A, following action 115 is the decision point, 125, which tests if Q_Ingr_ID_Vld is TRUE and Q_Enable is TRUE and it is FALSE that both Q_Ingr_First_Buf is TRUE and FreeQ_BufCnt is greater than or equal to Credit_Len. Queue Ingress ID Valid (Q_Ingr_ID_Vld), indicates that the Queue identified as the ingress frame's destination, by the classification engine, is valid for that frame. Q_Enable indicates if the queue is enabled. Free Queue Buffer Count (FreeQ_BufCnt) is the number of buffers assigned to the free queue, or equivalently, the number of buffers not assigned to any VOQ. Credit Length in Buffers (Credit_Len), a credit length, in buffers, is determined by the maximum frame length, in bytes, supported by the corresponding port, divided by the buffer length, in bytes. If the free queue buffer count is less than one credit length, it is necessary to drop the incoming frame. It is assumed that the external flow control mechanisms will typically keep this from happening.

If condition 125 is not met, the NO path is followed to action 130, Reject/Discard Queue Ingress Event. In this action, some processing is done to determine if the Fibre Channel (or other protocol) standard requires a reject message to be generated and transmitted, or whether the frame can simply be dropped (discarded).

Following action 130 is decision point 135, Q_Ingr_First_Buf=True? Queue Ingress First Buffer (Q_Ingr_First_Buf), indicates first ingress buffer event for corresponding frame. If this condition is met, the YES path is followed to action 140, Return_Credit=1. This action sends a signal that triggers the return of a flow control credit. In the case of Fibre Channel, this action would trigger the generation and transmission of a R_RDY primitive to the external device attached to this port, thereby providing that device with an additional buffer-to-buffer credit, permitting the device to transmit an additional frame to this port. Following action 140, Buffer Ingress Cycle End, 145, is reached, ending the buffer ingress cycle.

If condition 135 is not met, action 140 is bypassed and the buffer ingress cycle is terminated at 145.

If the condition 125 was met, the YES path is followed to action 150, Accept Queue Ingress Event. In this action, the data is written into the queue. Subsequent to action 150 is decision point 155, Q_Ingr_First_Buf=True? Queue Ingress First Buffer (Q_Ingr_First_Buf), indicates first ingress buffer event for corresponding frame. If this is the first ingress buffer event for this frame, the YES path is followed to action 160, First_Buf_Ptr=FreeQ_TlPtr. The value of the first buffer pointer (First_Buf_Ptr) is set equal to the Free Queue Tail Pointer. This value is used near the end of the buffer ingress cycle, as a pointer to the first buffer of a frame, for the purpose of inserting the frame's length, in bytes, into the first buffer's Buffer Next Length Field.

Referring in particular to FIGS. 3A and 3B, following action 160 is decision point 165, Q_Ovflw_Act|| (Q_BufCnt>Q_Max_Bufs)|| (FreeQ_BufCnt<Max_CreditBufs)=True? This conditional tests if either the queue overflow active indicator (Q_Ovflw_Act) is true, indicating that the queue is already in the overflow condition, or if the Queue Buffer Count (Q_BufCnt) exceeds Q_Max_Bufs the maximum number of buffers the queue can use before triggering the queue overflow condition, or if the Free Queue Buffer Count (FreeQ_BufCnt), which is the number of buffers in the free queue, is less than the Credit Space in Buffers (Max_CreditBufs), indicating a memory system overflow condition. Maximum Queue Space in Buffers, (Q_Max_Bufs), represents the maximum number of buffers a queue can use before the Queue is determined to be in the overflow state and credits are withheld. Credit Space in Buffers, (Max_CreditBufs), represents the total number buffers required to hold as many maximum length frames as the number of flow control credits (i.e. Credit_Len times the number of credits). Credit Length in Buffers (Credit_Len), a credit length, in buffers, is determined by the ceiling function of the maximum frame length in bytes supported by the corresponding port divided by the buffer length in bytes.

Referring in particular to FIGS. 3B and 3C, if the result of decision point 165 is negative, the next event is action 195, Return_Credit. This action sends a signal that triggers the return of a flow control credit. In the case of Fibre Channel, this action would trigger the generation and transmission of a R_RDY primitive to the external device attached to this port, thereby providing that device with an additional buffer-to-buffer credit, permitting the device to transmit an additional frame to this port. Following action 195 is decision point 200, described below.

Referring now to FIG. 3B, if the result of decision point 165 is affirmative, the YES path is followed to decision point 170, which tests if Q_Ovflw_Act|| (Q_BufCnt>Q_Max_Bufs) is TRUE. Q_Ovflw_Act indicates of the queue is already in the overflow state. Q_BufCnt is the number of buffers currently used by the queue, and if this number exceeds Q_Max_Bufs, then the queue is entering the overflow state.

If the result of 170 is negative, the next action is 175 Port_CreditCnt=Port_CreditCnt+1. The memory system is congested, and the port credit counter is incremented. Next is conditional 200, described below.

Referring now to FIGS. 3B and 3C, if the result of 170 is affirmative, the next action is 180, Q_CreditCnt_Tbl[Q_Ingr_ID]=Q_CreditCnt+1. The queue is congested, and the queue credit counter is incremented. Next is conditional 185, which tests if Q_Ovflw_Act=TRUE, indicating that the queue is in the overflow condition and was in the overflow condition prior to this buffer ingress cycle. If YES, then conditional 200, described below, is the next state. If NO, then the Q_Ovflw_Act table needs to be updated, indicating that the queue is now in the overflow state. This is done in the first step of state 190, Q_Ovflw_Act_Tbl[Q_Ingr_ID]=1. The second step of state 190 updates the statistic that counts the number of times the port has had a queue overflow event, Port_Q_OvflwCnt=Port_Q_OvflwCnt+1. After state 190 is state 200.

Referring now to FIG. 3C, state 200 is a conditional that tests if Q_BufCnt=0, indicating that the queue is empty. If the result is affirmative, the queue tail pointer is not modified and the next state is action 210, described below. If the result of 200 is negative, the next state is action 205, Q_TlPtr_Tbl [Q_Ingr_ID]=FreeQ_TlPtr. This sets the tail pointer of the queue equal to the tail pointer of the free queue. The next state is 210, Q_HdPtr_Tbl[Q_Ingr_ID]=FreeQ_TlPtr.

Following state 210, two sequences of actions and decision points are followed in parallel. In one of these sequences (on the left in the figure) the next state is a conditional 250, testing if Q_Ingr_Last_Buf=TRUE, indicating that this is the last buffer ingress event for the corresponding frame. If this is true, state 255 increments a statistic, the frame count for this queue: Q_FrmCnt_Tbl[Q_Ingr_ID]=Q_FrmCnt+1. If conditional 250 is false, or if it is true and action 255 has been completed, the next state is 260, an action with two steps. The first step is to increment the statistic that counts the buffers in the queue: Q_BufCnt_Tbl[Q_Ingr_ID]=Q_BufCnt+1. The second step is to decrement the buffer count for the free queue: FreeQ_BufCnt=FreeQ_BufCnt−1. The "left" sequence is then complete. When the "right" sequence is also complete, the end of the buffer ingress cycle 145 is reached.

The "right" sequence of states following state 210 is described below. First is a sequence of four actions, 215, 220, 225, and 230, which update the linked list description of the buffer. Action 215, Buf_NxtPtr_Tbl[FreeQ_TlPtr]=Q_HdPtr, sets the Buffer Next Pointer table entry for the Free Queue Tail Pointer equal to the queue head pointer. Action 220, Buf_Last_Tbl[FreeQ_TlPtr]=Q_Ingr_Last_Buf, sets the Buffer Last Transfer Indicator for the Free Queue Tail Pointer equal to 0 or 1 depending on whether this buffer is not or is the last buffer for the corresponding frame. Action 225, Buf_First_Tbl[FreeQ_TlPtr]=Q_Ingr_First_Buf, sets the Buffer First Transfer Indicator for the Free Queue Tail Pointer equal to 0 or 1 depending on whether this buffer is not or is the first buffer for the corresponding frame. Action 230, Buf_NxtLen_Tbl[FreeQ_TlPtr]=Q_Ingr_Buf_Len, sets the Buffer Next Length Field for the Free Queue Tail Pointer equal to the length of the data in bytes.

Following action 230 is action 235, FreeQ_TlPtr=Buf_NxtPtr_Tbl[FreeQ_TlPtr] which updates the free queue tail pointer to the next buffer pointer value. Following state 235 is state 240, a conditional that tests if Q_Ingr_Last_Buf && !Q_Ingr_First_Buf=TRUE. If NO, the "right" sequence ends. If YES, state 245 sets the buffer next length field equal to the frame length: Buf_NxtLen_Tbl [First_Buf_Ptr]=Q_Ingr_Frm_Len. Following state 245, the "right" sequence ends. When both the "left" and "right" sequences following state 210 are complete, the buffer ingress cycle ends, state 145.

Figure 4A:
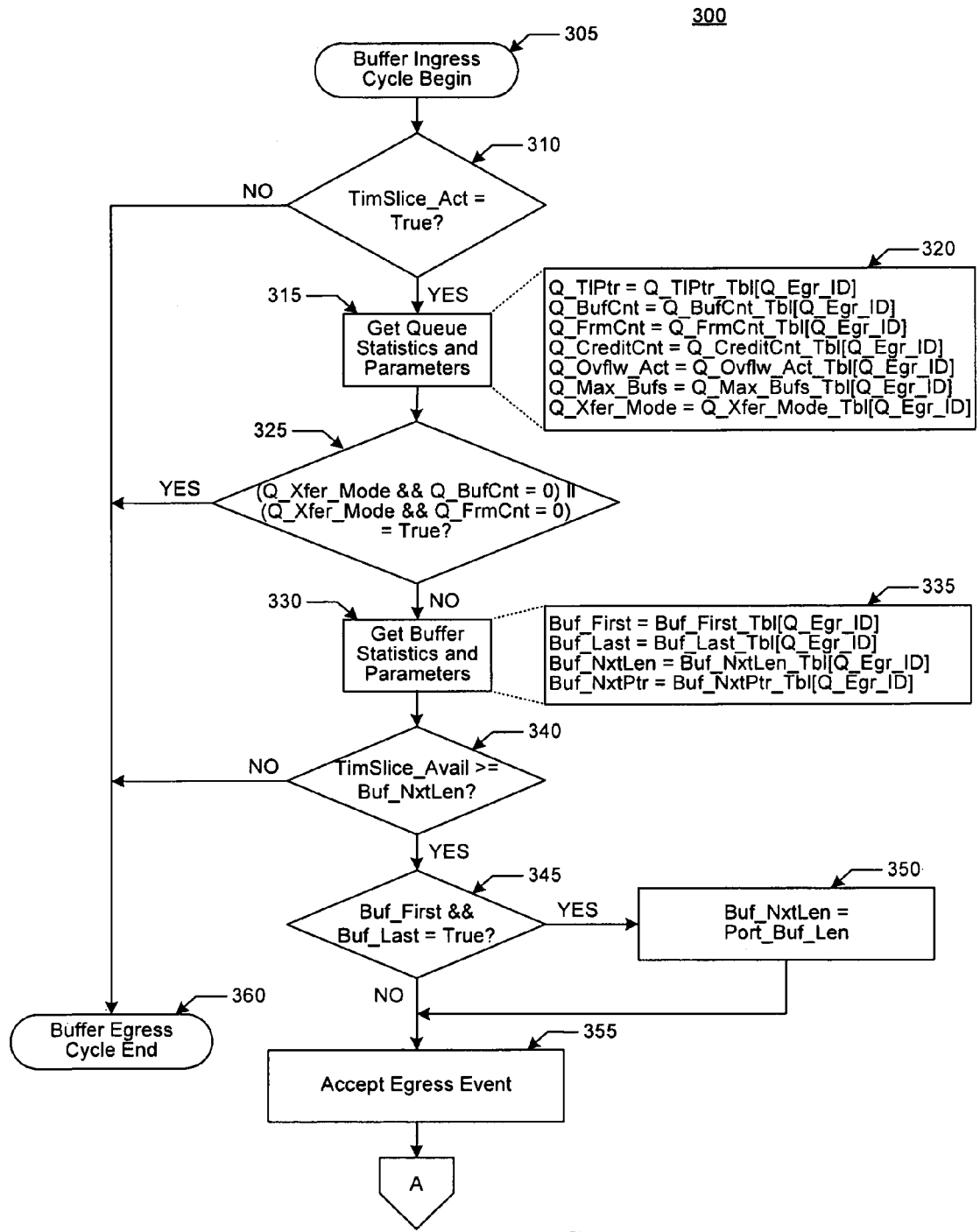
FIGS. 4A-4C provide a flow chart of a buffer egress cycle wherein it is determined if a frame can be transmitted from the ingress memory system to the switch fabric, and if so, various pointers and counters are updated.
Figure 4B:
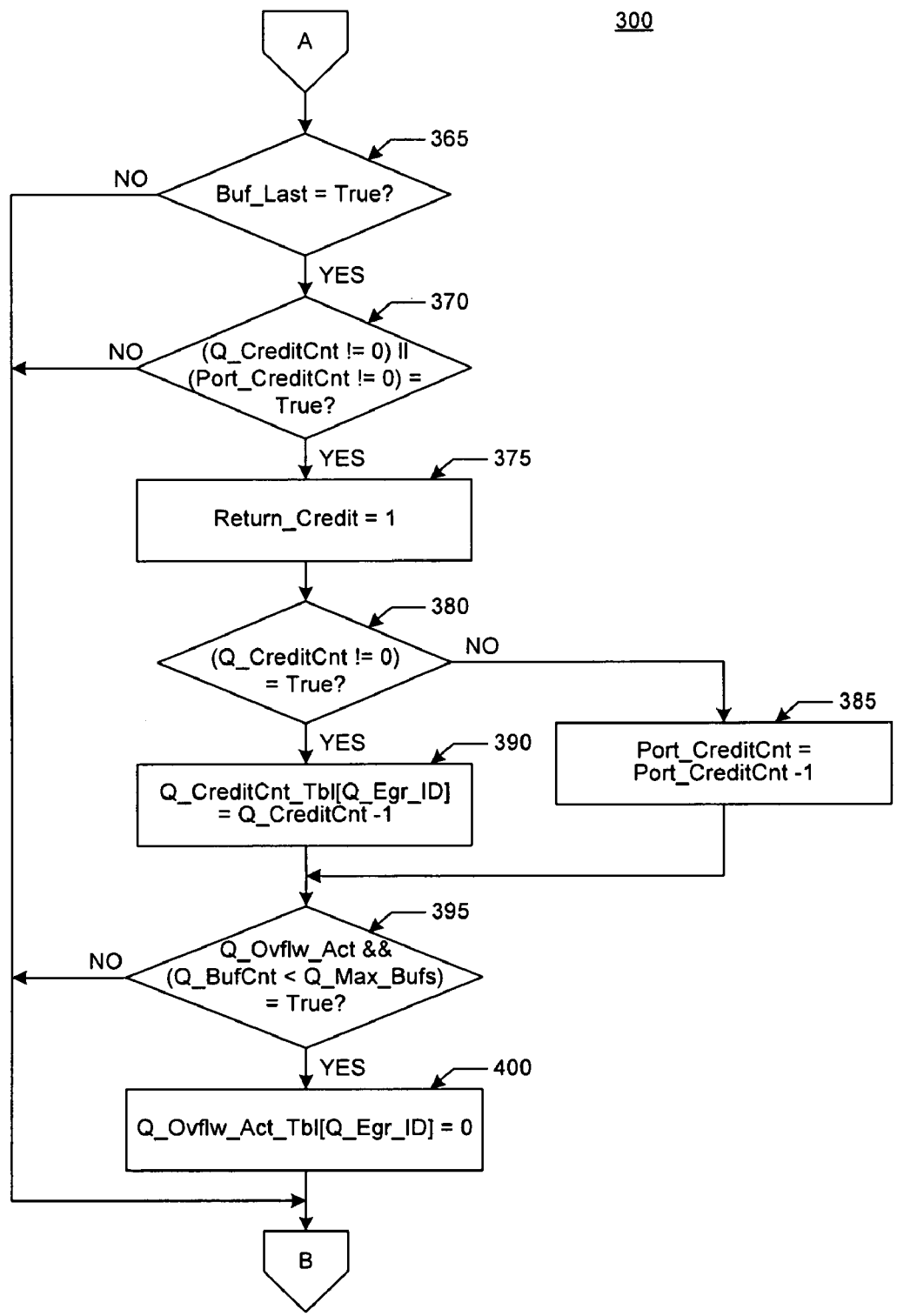
Figure 4C:
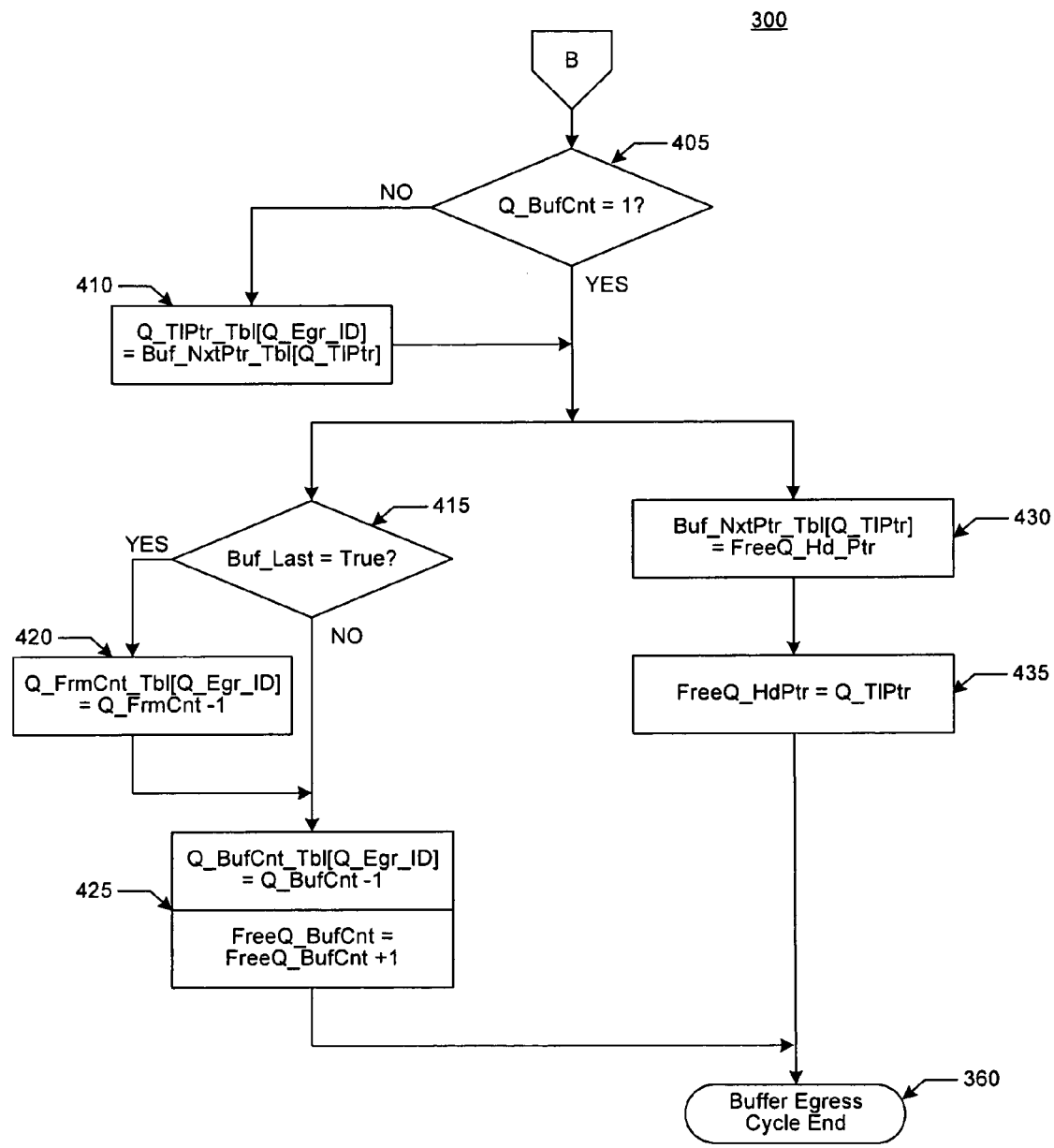

FIGS. 4A, 4B, and 4C combine to form a flow chart depicting the buffer egress cycle, 300. The flow chart is constructed in such a way as to indicate an exemplary sequence of events, with no contention issues. The buffer egress cycle begins as state 305. Next is the conditional state 310, which tests if TimeSlice_Act=TRUE. TimeSlice_Act indicates that there is an active time slice, meaning that this queue is authorized or enabled to transmit into the internal switch fabric at this time.

If the result of the conditional is negative, the queue is not authorized or enabled to transmit at this time, and the buffer egress cycle ends, state 360. If the result of conditional 310 is affirmative, then 315 is the next state. This state is the action of getting queue statistics and parameters and writing them to temporary variables. The list of statistics and parameters, and the names of the temporary variables are indicated in the expansion block 320. The temporary variables are Queue Tail Pointer (Q_TlPtr), Queue Buffer Count (Q_BufCnt), Queue Frame Count (Q_FrmCnt), Queue Credit Count (Q_CreditCnt), Queue Overflow Active (Q_Ovflw_Act), Queue Maximum Buffers (Q_Max_Bufs), and Queue Transfer Mode (Q_Xfer_Mode). In order, respectively, these variables represent: the pointer to the tail of the queue, the current number of buffers occupied in the queue, the current number of complete frames in the queue, the flow control credit count specific to this queue, a 0/1 indicator of whether or not the queue is in the overflow state, the maximum number of buffers the queue can use before entering the overflow state, and a 0/1 indicator of whether or not the queue can segment frames according to a well-defined segmentation and reassembly (SAR) procedure followed by both the ingress and egress memory systems or if the queue is to transmit only complete frames within a time slice.

Referring now to FIG. 4A, state 320 transitions to state 325, a conditional that tests if (Q_Xfer_Mode && Q_BufCnt=0) ||(!Q_Xfer_Mode && Q_FrmCnt=0). This tests if the Queue Transfer Mode is SAR but the queue is not using any buffers so that there is nothing to transfer, or if the transfer mode is nonSAR, but there are no complete frames in the queue. If the test is affirmative, this indicates that the queue has nothing it can transmit, and the buffer egress cycle terminates in state 360.

If the result of conditional 325 is negative, there is a transition to state 330, get buffer statistics and parameters, and write them to four temporary variables, Buf_First, Buf_Last, Buf_NxtLen, and Buf_NxtPtr. In order, respectively, these variables represent: a 0/1 indicator of whether this is the first buffer of a frame, a 0/1 indicator of whether this is the last buffer of a frame, the buffer next length field, and the buffer next pointer field.

State 330 transitions to state 340, a conditional that tests if TimeSlice_Avail>=Buf_NxtLen: is the remaining time in the current time slice sufficient to transmit Buf_NxtLen buffers. If the result is negative, the queue cannot transmit any more during the current time slice, and the buffer egress cycle ends in state 360.

If the result of the conditional in state 340 is affirmative, the transition is to state 345, a conditional that tests if Buf_First && !Buf_Last. This tests if the current buffer is the first buffer of the corresponding frame and it is not the last buffer of the corresponding frame.

If the result of the conditional in state 345 is affirmative, the transition is to state 350, the action of setting the buffer next length field Buf_NxtLen equal to the buffer length in bytes supported by the port Port_Buf_Len.

Referring now to FIG. 4, following state 350, or if the result of 345 is negative, the transition is to state 355, accept egress event, which moves the data. State 355 transitions to state 365, the conditional testing if Buf_Last is TRUE. If the result is negative, several states are bypassed and the transition is to state 405, described below.

Referring now to FIGS. 4B and 4C, if the result of conditional 365 is affirmative, the current buffer is the last buffer of the corresponding frame, and the transition is to state 370, a conditional testing if (Q_CreditCnt !=0)||(Port_CreditCnt !=0)=TRUE. This is a test to determine if either the queue credit count or the port credit count is nonzero. If the result is negative, several states are bypassed and the transition is to state 405.

Referring now to FIG. 4B, if the result of conditional 370 is affirmative, the transition is to state 375, which sets the Return_Credit variable equal to unity, Return_Credit=1. State 375 transitions to 380, a conditional that tests if the queue credit count is nonzero, (Q_CreditCnt !=0)=TRUE? If the result is negative, this implies that the port credit count is nonzero, and the transition is to state 385, which decrements the port credit count: Port_CreditCnt=Port_CreditCnt−1.

Referring now to FIGS. 4B and 4C, if the queue credit count is nonzero, state 380 transitions to 390, which decrements the queue counter: Q_CreditCnt_Tbl[Q_Egr_ID] =Q_CreditCnt−1. States 385 and 390 both transition to state 395, a conditional that tests if Q_Ovflw_Act && (Q_BufCnt<Q_MaxBufs)=TRUE. This tests if the queue is in the overflow state and the current number of buffers used by the queue is less than the maximum number of buffers the queue can use before triggering the overflow state. If the result of the conditional is affirmative, state 400 is bypassed, and the transition is to state 405.

Referring now to FIG. 4B, if the result of conditional 395 is negative, the transition is to state 400, which resets the queue overflow active indicator to zero for that queue, indicating that the queue is no longer in the overflow state.

Referring now to FIGS. 4B and 4C, state 400 transitions to state 405, a conditional that tests if the current number of buffers used by the queue is unity: Q_BufCnt=1. If not, the transition is to state 410, an action that sets the tail pointer of the queue equal to the buffer next pointer of the old queue tail pointer.

Referring now to FIG. 4C, state 410 or state 405 with affirmative result transitions to two parallel sequences of states, which are denoted the "left" and "right" sequences, in correspondence with the left-hand and right-hand portions of the flow diagram in FIG. 4C. The left sequence begins with state 415, which tests if the current buffer is the last buffer of the corresponding frame: Buf_Last=TRUE? If so, the state transitions to state 420 which decrements the queue frame counter: Q_FrmCnt_Tbl[Q_Egr_ID]=Q_FrmCnt−1.

State 420 or state 415 with negative result transitions to state 425, an action with two steps. In the first step, the queue buffer count is decremented: Q_BufCnt_Tbl[Q_Egr_ID] =Q_BufCnt−1. In the second step of state 425, the free queue buffer count is incremented: FreeQ_BufCnt=FreeQ_BufCnt+1. State 425 ends the left sequence. When both the left and right sequences are complete, the buffer egress cycle terminates at state 360.

Referring still to FIG. 4C, the right sequence begins with state 430, an action to update the buffer next pointer of the queue tail pointer to the free queue head pointer: Buf_NxtPtr_Tbl[Q_TlPtr]=FreeQ_HdPtr. State 430 transitions to state 435, the action to set the free queue head pointer FreeQ_HdPtr equal to the queue tail pointer Q_TlPtr.

When both state 425 from the left sequence and state 435 from the right sequence are complete, the buffer egress cycle terminates at state 360.

Figure 5A:
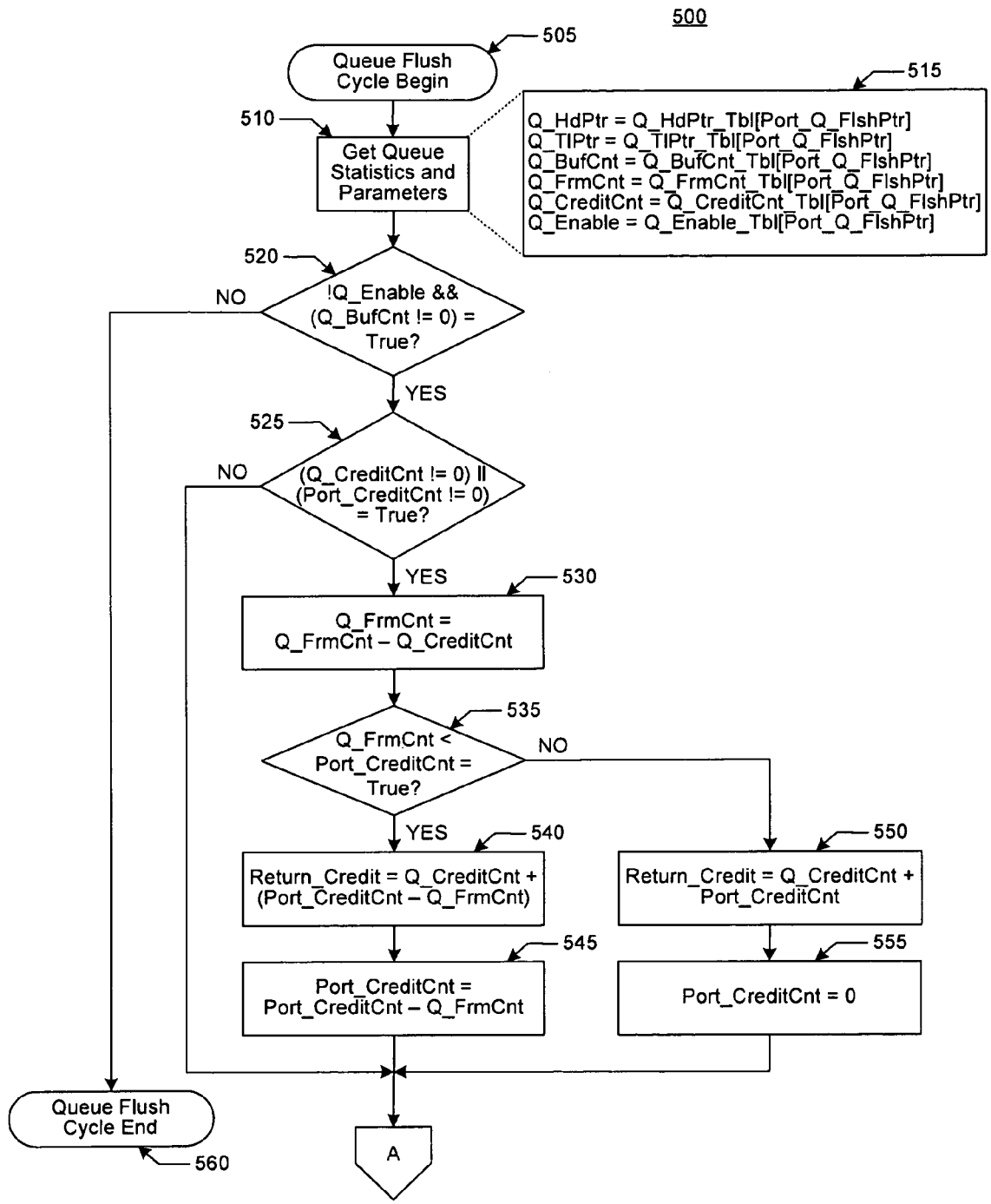
FIGS. 5A-5B provide a flow chart of a queue flush cycle, used to gracefully flush or eliminate the contents of a single queue, properly restoring the credit counters, pointers, and other counters.
Figure 5B:
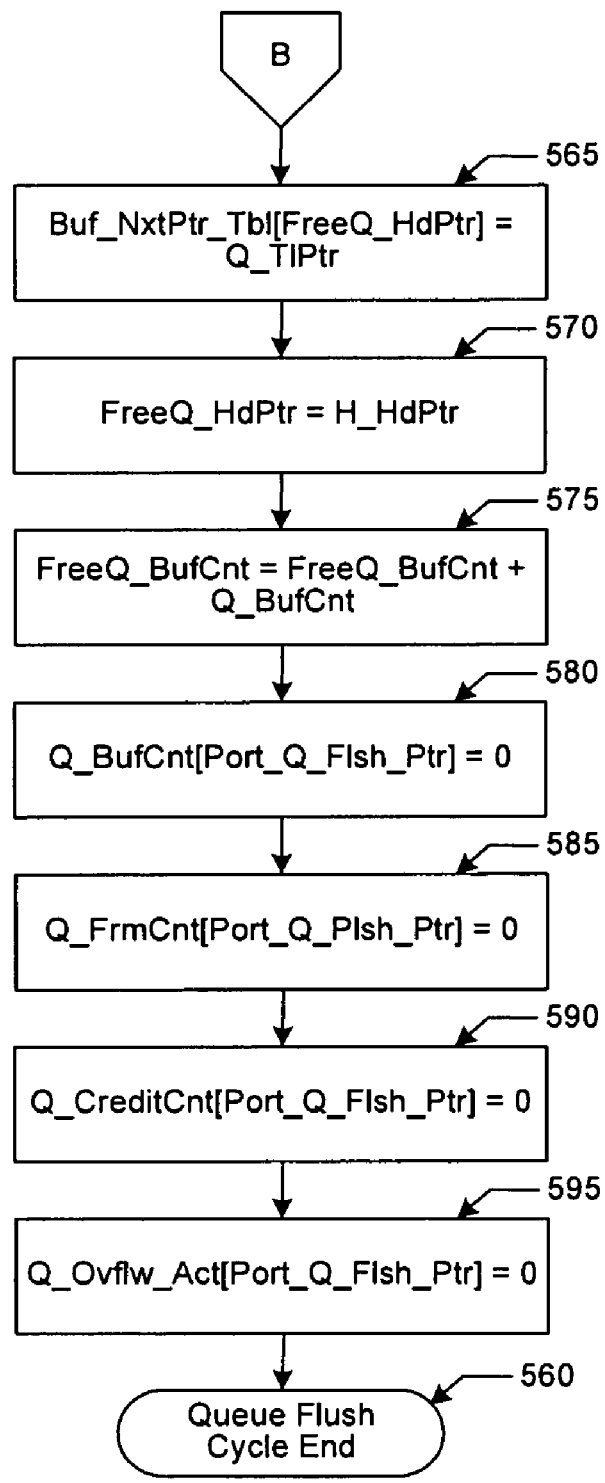

FIGS. 5A and 5B combine to form a flow chart depicting the single queue flush cycle 500. This cycle is used to gracefully flush or eliminate the contents of a single queue, properly restoring the credit counters, pointers, and other counters. The flow chart is constructed in such a way as to indicate the actual sequence of events, with no contention issues. The flush cycle begins at state 505. The first transition is to 510, Get Queue Statistics and Parameters, where six values are written into temporary variables. The list of statistics and parameters, and the names of the temporary variables are indicated in the expansion block 515. The temporary variables are Queue Head Pointer (Q_HdPtr), Queue Tail Pointer (Q_TlPtr), Queue Buffer Count (Q_BufCnt), Queue Frame Count (Q_FrmCnt), Queue Credit Count (Q_CreditCnt), and Queue Enable (Q_Enable). In order, respectively, these variables represent: the pointer to the head of the queue, the pointer to the tail of the queue, the current number of buffers occupied in the queue, the current number of complete frames in the queue, the flow control credit count specific to this queue, and a 0/1 indicator of whether or not the queue is enabled.

Referring now to FIG. 5A, state 510 transitions to state 520, a conditional that tests if the queue is not enabled and the current queue buffer count is nonzero, !Q_Enable && (Q_BufCnt !=0)=True? Only if this condition is true, does any further action need to be taken in the flush cycle. Thus, if the result of the conditional is negative, the next state is 560, Queue Flush Cycle End.

Referring now to FIGS. 5A and 5B, if the result of the conditional 520 is affirmative, the next state is 525, which is a conditional that tests if either the queue credit count or the port credit count is nonzero, (Q_CreditCnt !=0)||(Port_CreditCnt !=0)=True? If the result is negative, then it is unnecessary to relinquish these credits, several states may be bypassed, and the transition is to state 565, which is described below.

Referring now to FIG. 5A, if the result of conditional 525 is affirmative, the next state is 530, which decreases the queue frame count by the queue credit count, Q_FrmCnt=Q_FrmCnt−Q_CreditCnt.

Referring still to FIG. 5A, the next state is 535, a conditional that tests if the queue frame count is less than the port credit count, (Q_FrmCnt<Port_CreditCnt)=True? If conditional 535 is true, the next state is 540, an action to set the variable Return_Credit equal to the sum of the queue and port credit counts minus the queue frame count, Return_Credit=Q_CreditCnt+(Port_CreditCnt−Q_FrmCnt).

Referring now to FIGS. 5A and 5B, state 545 follows 540, and decreases the port credit count by the number of frames in the queue, Port_CreditCnt=Port_CreditCnt−Q_FrmCnt. State 545 transitions to state 565, described below.

If conditional 535 is false, the next state is 550, an action to set the variable Return_Credit equal to the sum of the queue and port credit count, Return_Credit=Q_CreditCnt+Port_CreditCnt. State 555 follows state 550, and sets the port credit count to zero, Port_CreditCnt=0. State 525 with negative result, state 545, and state 555 each transition to state 565, which sets the buffer next pointer of the free queue head pointer equal to the queue tail pointer, Buf_NxtPtr_Tbl[FreeQ_HdPtr]=Q_TlPtr. State 565 transitions to state 570, which sets the free queue head pointer equal to the queue head pointer. State 570 transitions to state 575, which increases the free queue buffer count by the queue buffer count, FreeQ_BufCnt=FreeQ_BufCnt+Q_BufCnt. State 575 transitions to state 580, which resets the queue buffer count of the queue at the port queue flush pointer to zero, Q_BufCnt [Port_Q_Flsh_Ptr]=0. State 580 transitions to state 585, which resets the queue frame count for the queue at the port queue flush pointer to zero, Q_FrmCnt[Port_Q_Flsh_Ptr]=0. State 585 transitions to state 590, which resets the queue credit count for the queue at the port queue flush pointer to zero, Q_CreditCnt[Port_Q_Flsh_Ptr]=0. State 590 transitions to state 595, which resets the queue overflow active indicator for the queue at the port queue flush pointer to zero, indicating that the queue is not in the overflow state, Q_Ovflw_Act[Port_Q_Flsh_Ptr]0.

Figure 6:
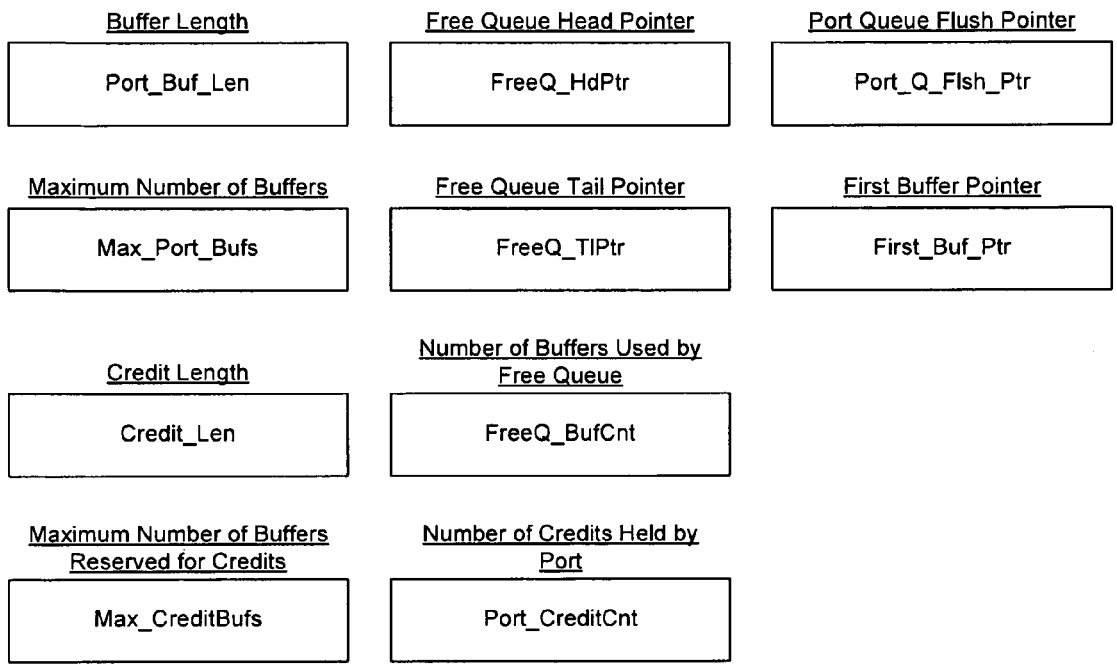
FIG. 6 presents a set of per-port parameters and information relevant to FIGS. 3-5, with descriptive title and associated variable name.

Referring now to FIG. 6, the per-port parameters and information are presented with descriptive title and associated variable name. The buffer length, Port_Buf_Len, is the length of a buffer, in bytes. Note that there is a buffer parameter, Buf_NxtLen, that specifies the length of a buffer based on its actual content and can range from one byte up to Port_Buf_Len, unless the buffer is the first buffer of a frame and the queue is not in SAR mode. The maximum number of buffers threshold, Max_Port_Bufs, is the total number of buffers supported by the port. The credit length, Credit_Len, is the length of a credit, in buffers. This value is typically determined by maximum frame length, supported by the port, in bytes, divided by the buffer length, in bytes, then rounded up to the next buffer. The maximum number of buffers reserved, Max_CreditBufs, is credit length multiplied by the maximum number of credits for the port. This value also corresponds to the minimum number of buffers the free queue can maintain before the port is considered to be in the overflow state. The Free Queue Head Pointer (FreeQ_HdPtr) is the free queue write pointer. The Free Queue Tail Pointer (FreeQ_TlPtr) is the free queue read pointer. The Free Queue Buffer Count (FreeQ_BufCnt) is the current number of buffers used by the free queue. The Port Credit Count, Port_CreditCnt is the current number of credits withheld due to frame reception while exceeding the Total Queue Buffer Space (Maximum Number of Port Buffers minus the Credit Space in Buffers) and not associated Queue Buffer Count exceeding Maximum Queue Space in Buffers. Port_CreditCnt can range from zero up to the maximum number of credits for the port. The Queue Flush Pointer (Port_Q_Flsh_Ptr) points to the queue that is being flushed. First Buffer Pointer (First_Buf_Ptr) is the pointer to the corresponding frame's first buffer location.

Figure 7:
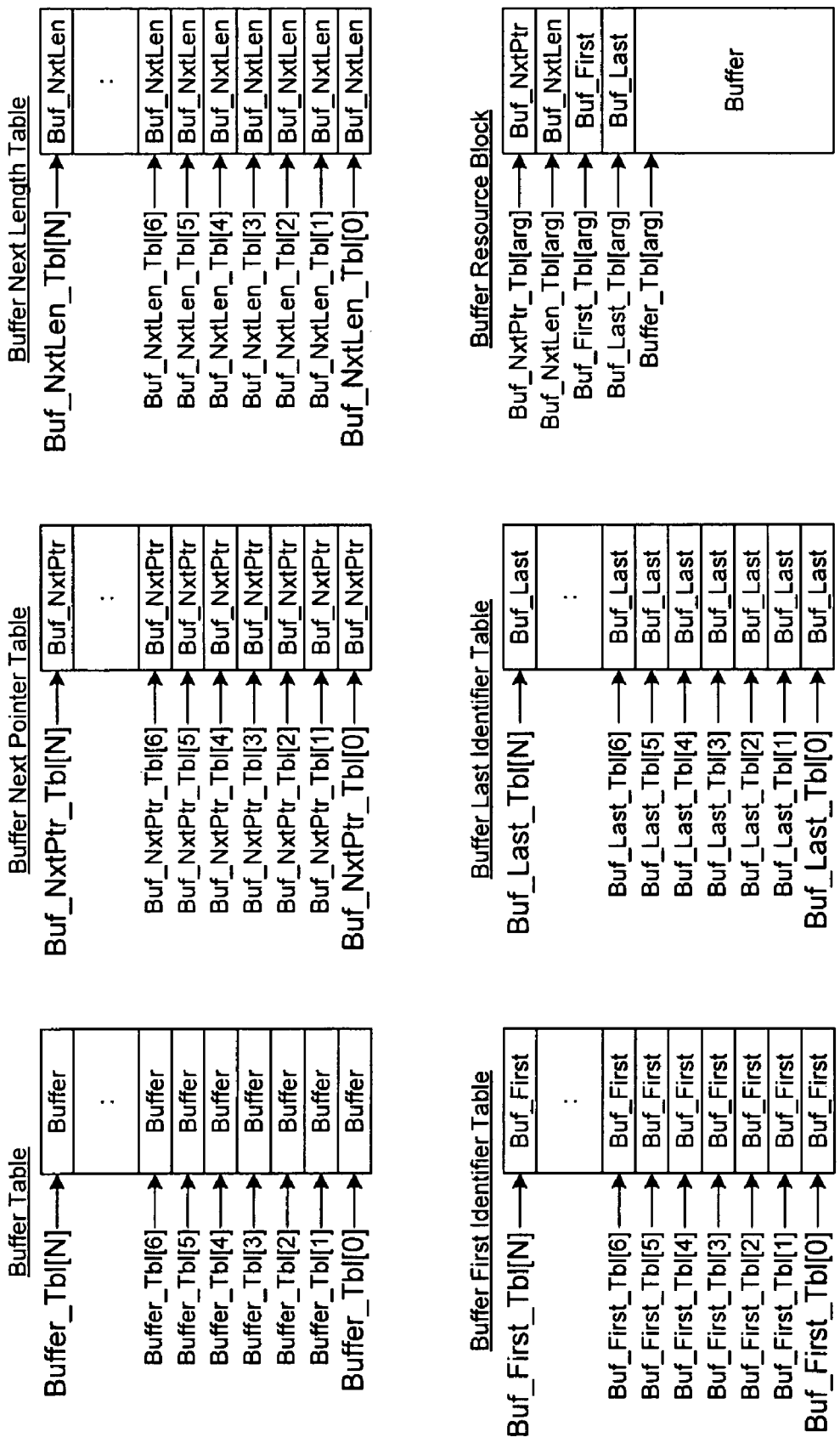
FIG. 7 depicts tables associated with "buffers," or buffer resource blocks, which in this context are the minimum-size blocks of memory that are allocated or deallocated in the ingress memory system.

FIG. 7 depicts the per-buffer parameters and information. This includes five tables of parameters, each of which has an entry for each buffer supported by the port. The maximum argument, N, represents one less than the Maximum Number of Port Buffers, N=Max_Port_Bufs–1. Also depicted in the figure are the four parameters/identifiers and the data space associated with a single buffer. The Buffer Table specifies the data space for each buffer. The Buffer Next Pointer Table specifies for each buffer the Buffer Next Pointer Field (Buf_NxtPtr), the link pointer to next buffer in queue. The Buffer Next Length Table specifies the Buffer Next Length Field (Buf_NxtLen), indicating the length of the buffer unless first buffer of frame (Buf_First=True), then indicating the length of the frame, in bytes, if the queue is not in SAR mode. The Buffer First Transfer Table specifies the Buffer First Transfer Indicator (Buf_First), which if true then indicates the first buffer of frame. The Buffer Last Transfer Table specifies the Buffer Last Transfer Indicator (Buf_Last) for each buffer, which if true then indicates the last buffer of frame. It is possible for both Buf_First and Buf_Last to be true for a given buffer, if the buffer holds an entire frame.

Figure 8A:
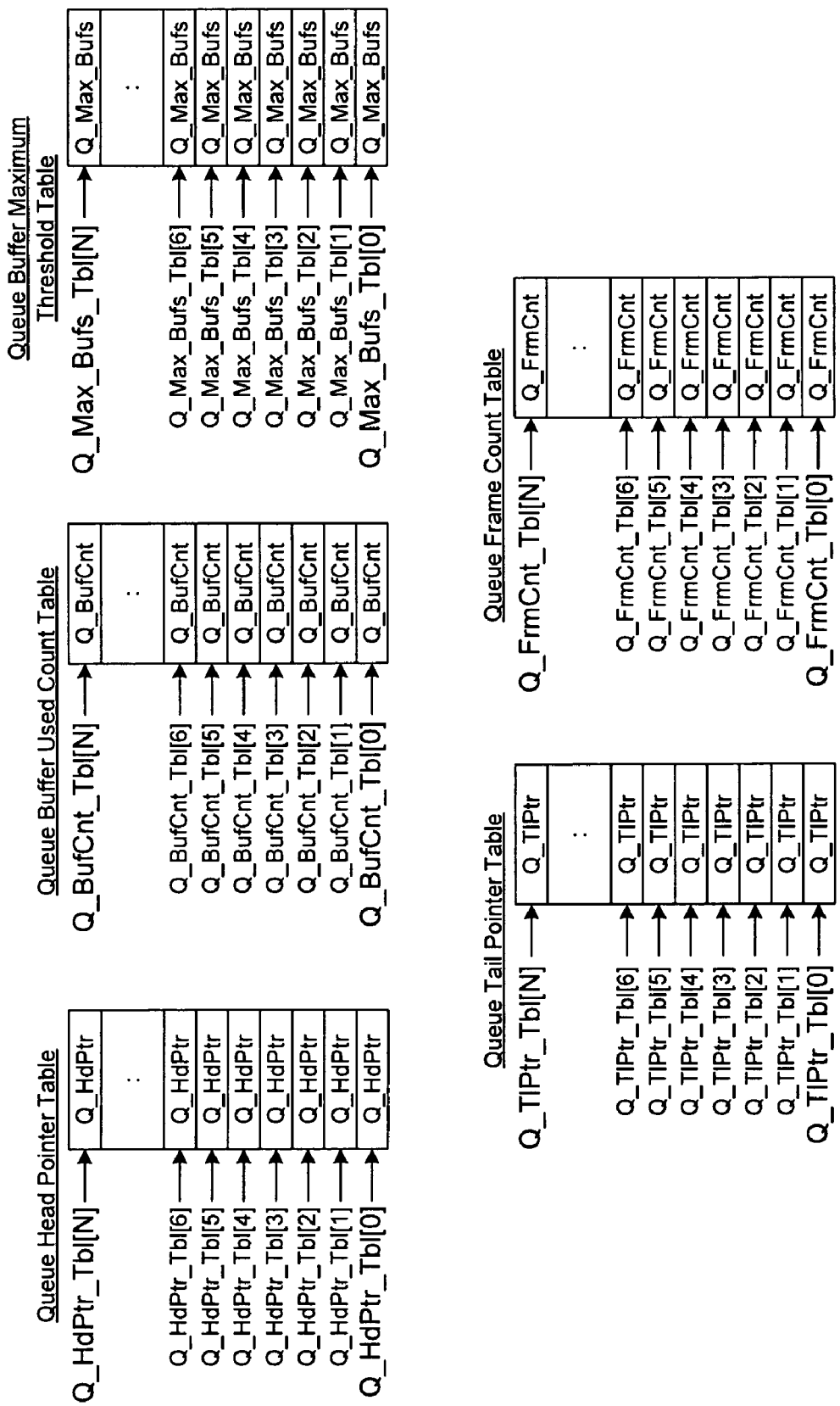
FIGS. 8A-8B depict tables associated with each VOQ, and depicts the allocation of multiple buffer resource blocks to three frames assigned to a particular VOQ and associated table values.
Figure 8B:
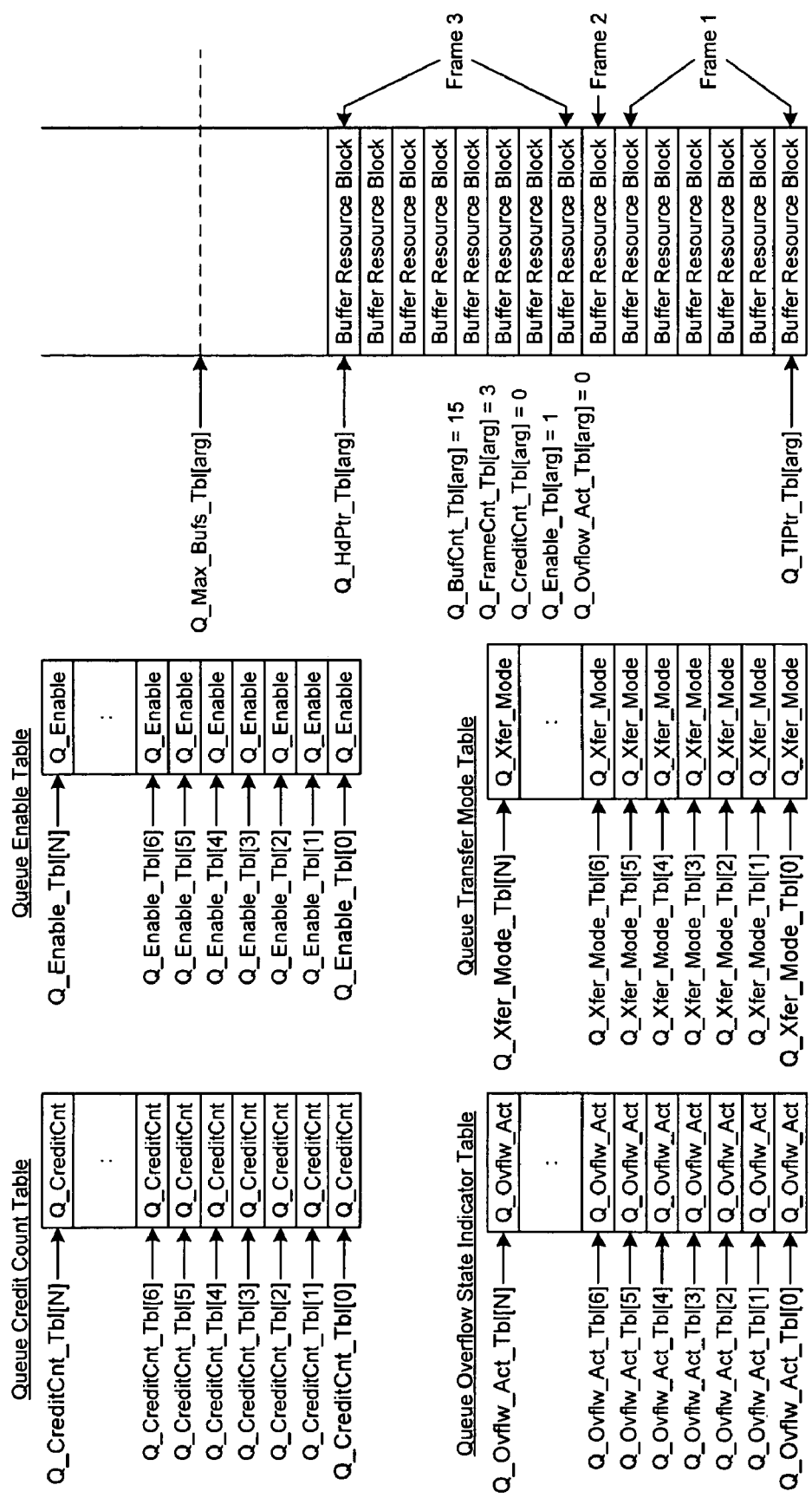

FIGS. 8A and 8B depict the per-queue parameters and information. The table arguments range from 0 to N, where N is one less than the number of queues supported by the port. Queue Head Pointer (Q_HdPtr) is the queue write pointer, and points to last buffer in queue. Queue Buffer Used Count (Q_BufCnt) is the current number of buffers used by the queue. Maximum Queue Space in Buffers (Q_Max_Bufs) represents the maximum number of buffers a queue can use before the Queue is determined to be in the overflow state and credits are withheld. Queue Tail Pointer (Q_TlPtr) is the queue read pointer, and points to first buffer in queue. Queue Frame Count (Q_FrmCnt) is the current number of frames stored in the queue. Credits Held by Queue (Q_CreditCnt) is the number of credits being held by the queue, due to receiving frames while in the queue overflow state. Queue Enable (Q_Enable) indicates if the queue is enabled for use. Queue Overflow State Indicator (Q_Ovflw_Act) indicates if the queue is currently in the queue overflow state, i.e. if the queue overflow state is active. Queue Transfer Delivery Mode (Q_Xfer_Mode) if high then indicates SAR egress transfer mode, else if low then non-SAR egress transfer mode. FIG. 6 also depicts an enabled queue that currently holds three frames which in aggregate use 15 buffers. The queue is below the queue maximum buffer threshold. The figure indicates the values of the parameters/indicators in the queue parameter/indicator tables with the exception of Q_Xfer_Mode which could be either 0 or 1 for the depicted queue. The argument, arg, is the number of the queue for that port.

Figure 9A:
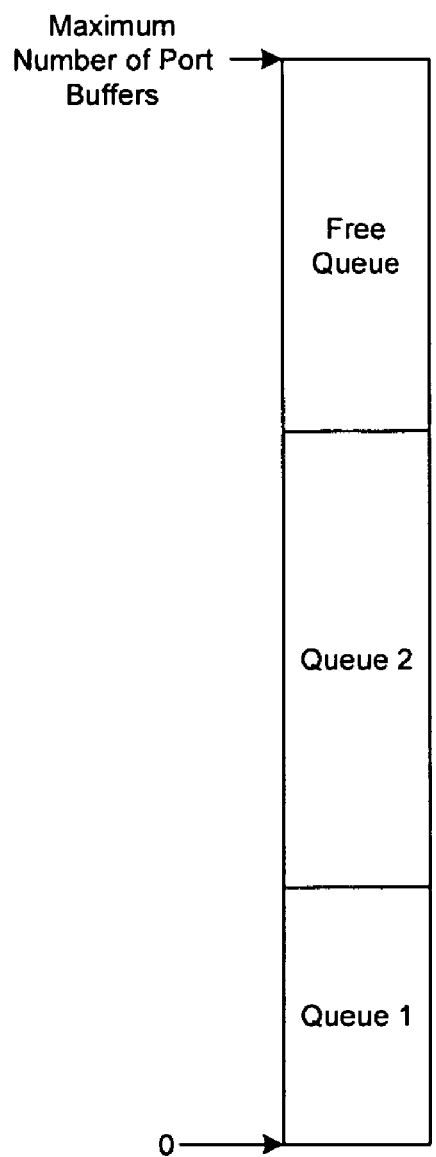
FIG. 9A shows that the ingress memory system is dynamically partitioned into space for individual VOQs, while the remaining physical memory in the ingress memory system is assigned to the "free queue"

FIGS. 9A, 9B, 9C, 9D and 9E combine to depict the provisioning of the port's buffer space. FIG. 9A illustrates that a port's buffer space is distributed among one or more active queues, including the free queue. In the example depicted in the figure, there are two active queues, Queue 1 and Queue 2, that are using at least one buffer each. In general, each time an ingress buffer event is accepted the current number of buffers used by that queue is incremented by one and the number of buffers used by the free queue is decremented by one. Each time an egress buffer event is accepted the current number of buffers used by that queue is decremented by one and the number of buffers used by the free queue is incremented by one. The maximum number of buffers supported by a port is equal to the sum of buffers used by each active queue including the free queue.

Figure 9B:
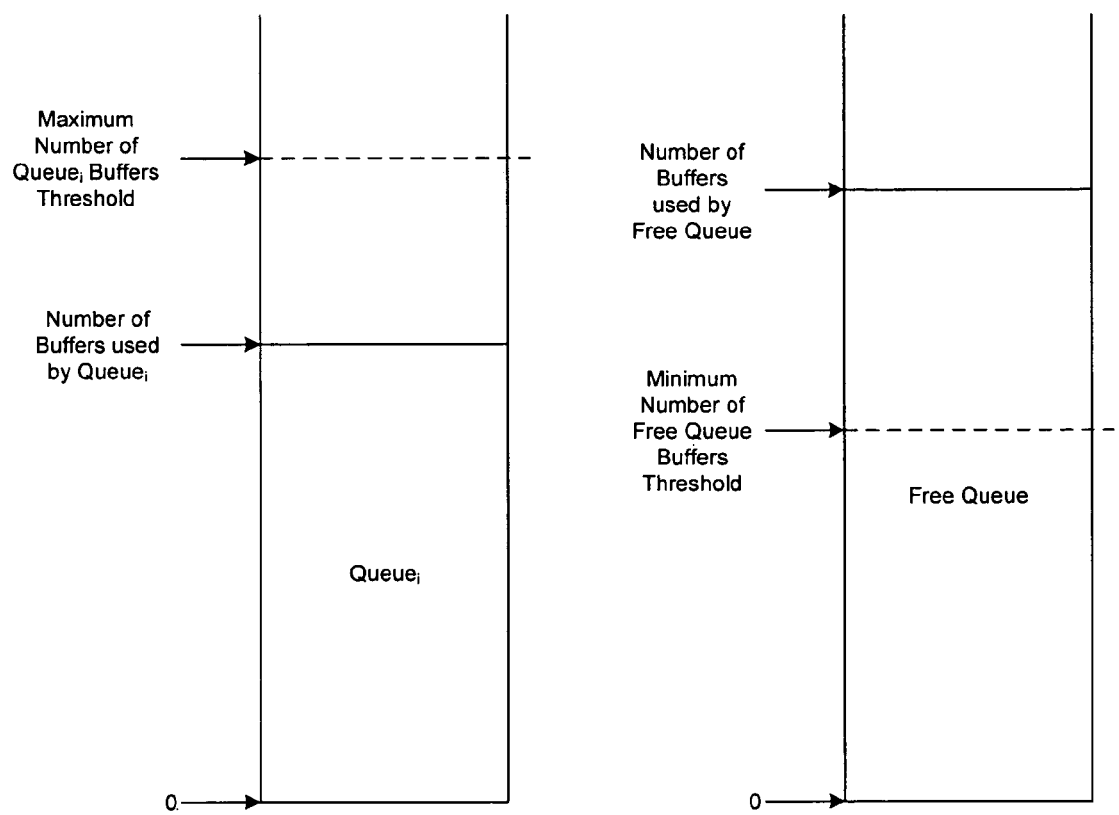
FIG. 9B shows that each individual VOQ is assigned a maximum number of buffers threshold, and the free queue is assigned a minimum number of buffers threshold.

FIG. 9B illustrates that each queue, excluding the free queue, is assigned a maximum queue buffer threshold. This threshold represents the number of buffers a queue may use before entering the queue overflow state. If the number of buffers used by a queue exceeds the maximum queue buffer threshold, a queue credit is reserved and not returned for each frame partially or fully exceeding the threshold. Because a credit is not returned, the external flow control mechanism is notified to reduce the incoming traffic. The free queue is assigned a minimum free queue buffer threshold representing the number of buffers reserved for credit buffer space. If the number of buffers used by the free queue drops below the minimum free queue buffer threshold, then port credits are reserved and not returned for each frame partially or fully below the threshold. Because a credit is not returned, the external flow control mechanism is notified to reduce the incoming traffic.

Figure 9C:
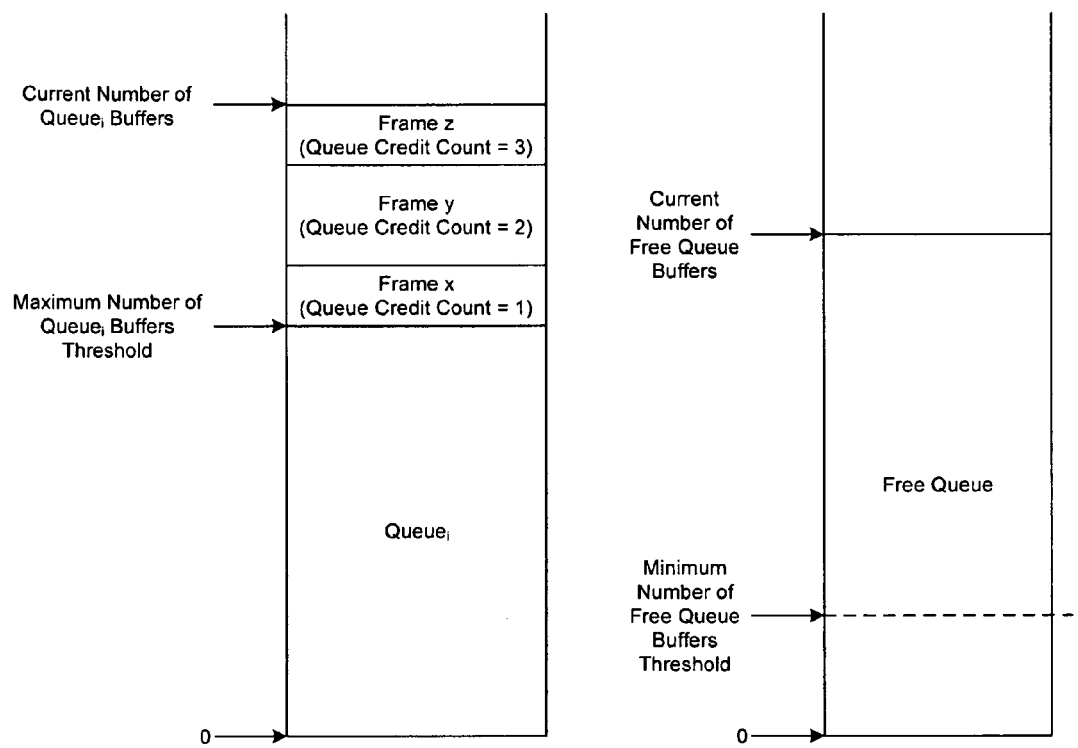
FIG. 9C shows that if the free queue is above its minimum number of buffers threshold, a VOQ can be assigned buffers above the queue's maximum number of buffers threshold, and the BB credit counter associated with the VOQ is incremented for each frame or partial frame above the threshold.

FIG. 9C illustrates the withholding of credits that results from the buffer count for a queue exceeding the maximum buffer count threshold for that queue. The free queue is above the minimum free queue buffer threshold before, during, and after the arrival of frames x, y, and z. However, the ith queue exceeds its maximum queue buffer threshold. A portion of frame x, and frames y and z exceed the threshold. Therefore, the queue credit count is incremented for each of these frames. It is assumed that the queue credit count is zero prior to the arrival of frame x.

Figure 9D:
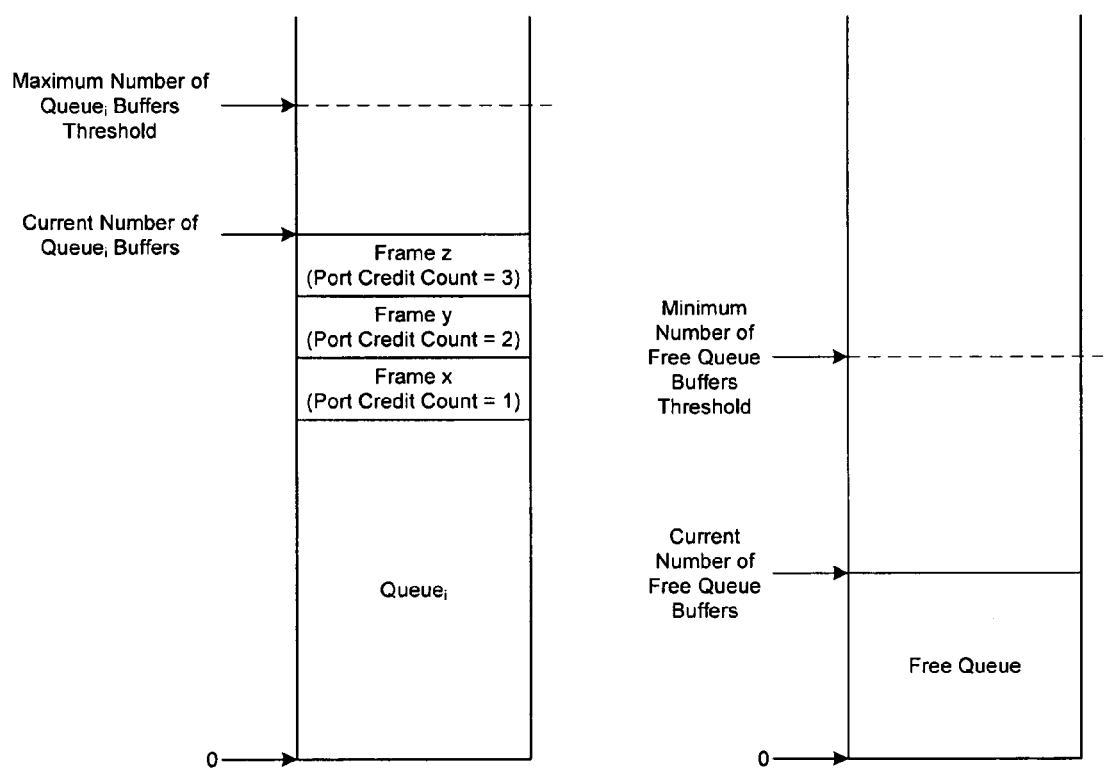
FIG. 9D shows that if the free queue is below its minimum number of buffers threshold, then when a frame is assigned to a particular VOQ that is below its maximum number of buffers threshold, the port BB credit count is incremented, rather than the queue BB credit count.

FIG. 9D illustrates the withholding of credits that results from the buffer count for the free queue dropping below the minimum free queue buffer count threshold. For each partial frame that is below the threshold, the port credit count is incremented. In the figure, frames x, y, and z have arrived and caused the free queue to drop below the threshold or to remain below the threshold, and the port credit count is incremented for each of these frames. It is assumed that the port credit count is zero prior to the arrival of frame x. at no point during the arrival of frames x, y, and z does the current number of buffers in the ith queue exceed the maximum buffer count threshold for that queue.

Figure 9E:
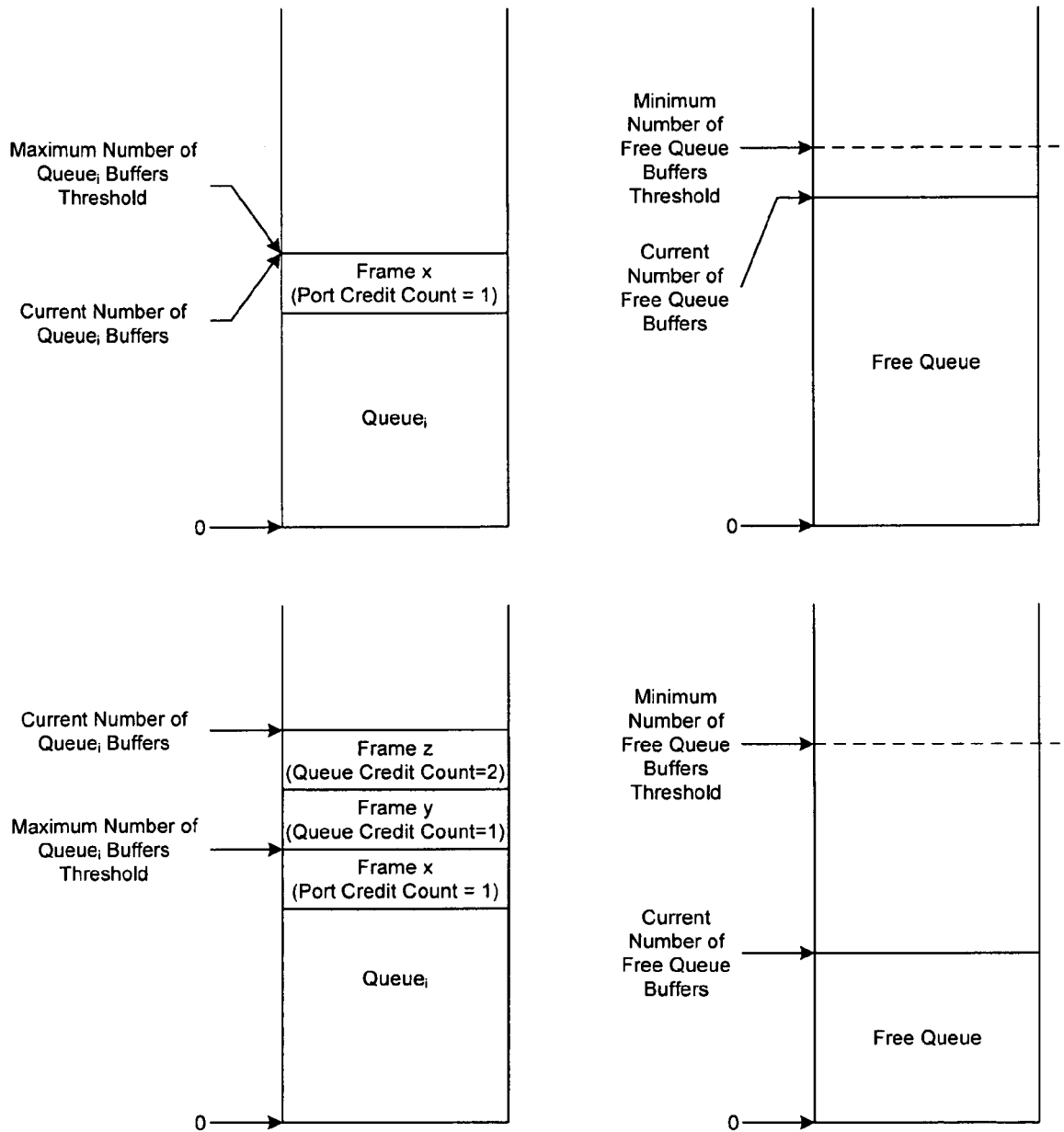
FIG. 9E shows that if the free queue is below its minimum number of buffers threshold and frames are assigned to a VOQ below its maximum number of buffers threshold, the port credit count is incremented, but if the free queue is below its minimum number of buffers threshold and frames are assigned to a VOQ above its maximum then the queue credit count is incremented.

FIG. 9E depicts frame arrivals that cross both a maximum queue buffer threshold and the minimum free queue buffer threshold. The top of the figure depicts the arrival of frame x. Frame x does not exceed the maximum queue buffer threshold, but does cause the free queue to drop below the minimum free queue buffer threshold. Therefore the arrival of frame x causes the port credit count to be incremented. It is assumed that the port credit count was zero prior to the arrival of frame x. The lower portion of FIG. 9E depicts the arrivals of frames y and z, subsequent to the arrival of frame x. During the times that frames y and z arrive, the free queue remains below the minimum free queue buffer threshold. However, frames y and z fully or partially exceed the maximum queue buffer threshold. Thus, the queue credit count is incremented for both frame y and frame z. In the figure, it is assumed that the queue credit count was zero prior to the arrival of frames x, y, and z.

The description and flow diagrams thus far are based upon the Guaranteed Delivery Threshold Indicator being set to unity. This indicates that frames are not to be dropped when a maximum queue buffer threshold is exceeded nor when the free queue buffer count drops below the minimum free queue buffer threshold, but rather that flow control credits are to be reserved and not returned. It is also possible to operate in the mode where the Guaranteed Delivery Threshold Indicator is set to zero, indicating that frames will be dropped when any queue maximum buffer threshold is exceeded or when the free queue buffer count drops below the minimum free queue buffer threshold.

Because of the lack of availability of Fibre Channel Class 4 HBAs, it is preferred that devices that aggregate or proxy for multiple logical or physical entities be endowed with the capabilities of the preferred embodiments of the present invention. Such devices may include certain blade servers, networked appliances, N_Port virtualizing devices, and storage array front ends.

While the invention is described primarily with the Fibre Channel standard, it is understood that the invention is applicable to various devices and protocols for which it is desirable to provided certain QoS levels. In addition, the illustrated embodiments have an exemplary architecture with certain components. It is understood that alternative partitions between hardware and software will be readily apparent to one of ordinary skill in the art and will be well within the scope of the invention.

One skilled in the art will appreciate further features and advantages of the invention based on the above-described embodiments. Accordingly, the invention is not to be limited by what has been particularly shown and described. All publications and references cited herein are expressly incorporated herein by reference in their entirety.

What is claimed is:

1. A method comprising:
    receiving data at a first port of a network switching device from a transmitting device;
    queuing the received data into a plurality of virtual output queues (VOQs) in an ingress memory system of the network switching device, including dynamically allocating memory to each of the plurality of VOQs on an as-needed basis;
    using a buffer-to-buffer credit scheme to regulate ingress of data into the network switching device at the first port, based on an amount of memory used by each of the VOQs and an amount of memory assigned to a free queue of the ingress memory system, and further based on a set of quality of service (QoS) related parameters and policies, wherein using the buffer-to-buffer credit scheme includes
        dynamically tracking and updating a number of queue credits associated with the first port, the number of queue credits being indicative of one or more of the VOQs using more than a maximum threshold number of buffers,
        dynamically tracking and updating a number of port credits associated with the first port, the number of port credits being indicative of a free queue having fewer than a minimum threshold number of buffers, and
        using the number of queue credits and the number of port credits to regulate incoming data traffic to the first port;
    outputting data from specific ones of the VOQs, based on the set of QoS related parameters and policies and the amount of memory used by the VOQs;
    associating the data output from the VOQs with QoS related metadata;
    transmitting the data output from the VOQs and the associated metadata into a switching fabric within the network switching device, for transmission to a second port within the network switching device; and
    transmitting the data from the second port to a device which is external to the network switching device.

2. A method as recited in claim 1, further comprising, in the second port, prior to transmitting the data from the second port to the device which is external to the network switching device:
    removing the metadata from the data transmitted through the switching fabric to the second port.

3. A method as recited in claim 1, wherein the method is performed within a storage server.

4. A method as recited in claim 1, wherein the data received at the first port is in a connectionless format.

5. A network switching device comprising:
    a plurality of ports, including a first port, each of the ports including a plurality of virtual output queues (VOQs);
    a switching fabric coupling together the plurality of ports; and
    a flow control mechanism to selectively queue data input to the network switching device at the first port into appropriate ones of the VOQs, including dynamically allocating memory to the VOQs on an as-needed basis, and to selectively output data from the VOQs according to a set of quality of service (QoS) criteria, the flow control mechanism further to implement a buffer-to-buffer credit scheme to regulate ingress of data at the first port, based on an amount of memory used by the VOQs, wherein use of the buffer-to-buffer credit scheme by the flow control mechanism includes
        dynamically tracking and updating a number of queue credits associated with the first port, the number of queue credits being indicative of one or more of the VOQs using more than a maximum threshold number of buffers,
        dynamically tracking and updating a number of port credits associated with the first port, the number of port credits being indicative of a free queue having fewer than a minimum threshold number of buffers, and
        using the number of queue credits and the number of port credits to regulate incoming data traffic to the first port.

6. A network switching device as recited in claim 5, further comprising:
   a metadata generator to create metadata for use in ensuring QoS and to associate the metadata with the data output from the VOQs, the data for transmission with the associated metadata through the switching fabric to another port within the network switching device.

7. A network switching device as recited in claim 6, further comprising:
   a metadata stripper to receive data from another one of the ports through the switching fabric and to strip QoS related metadata from the received data; and
   a receive memory system to buffer data received through the switching fabric prior to transmitting the data to a device external to the network switching device.

8. A network switching device as recited in claim 7, further comprising:
   a policy engine, operatively coupled to the classification engine, to maintain a set of established QoS related policies and parameters; and
   an administrative user interface to allow an administrator to interact with the policy engine to establish the set of QoS policies and parameters.

9. A network switching device as recited in claim 5, wherein the network switching device is implemented in a storage server.

10. A network switching device as recited in claim 5, wherein the flow control mechanism comprises:
    at least one scheduling/arbitration engine; and
    in each of the ports:
        a classification engine to selectively queue data input to the port into appropriate ones of the VOQs, the queued data to be subsequently output selectively from the VOQs under control of the scheduling/arbitration engine according to the set of QoS criteria;
        a queue ingress manager to dynamically allocate memory to the VOQs on an as-needed basis;
        a queue egress manager to deallocate memory from the VOQs; and
        a queue flush manager to delete contents of the VOQs.

11. A network switching device as recited in claim 10, wherein the queue ingress manager, the queue egress manager and the queue flush manager cooperatively implement the buffer-to-buffer credit scheme.

12. A network switching device as recited in claim 5, wherein the flow control mechanism comprises a scheduling/arbitration engine to control the outputting of data from the VOQs based on time-dependent attributes of the plurality of VOQs and the set of QoS criteria.

13. An apparatus comprising:
    a first port to receive data from an external device;
    a plurality of virtual output queues (VOQs) associated with the first port;
    means for queuing the received data into the plurality of VOQs;
    means for using a buffer-to-buffer credit scheme to regulate ingress of data into the network switching device at the first port, based on an amount of memory used by each of the VOQs, including
        means for dynamically tracking and updating a number of queue credits associated with the first port, the number of queue credits being indicative of one or more of the VOQs using more than a maximum threshold number of buffers,
        means for dynamically tracking and updating a number of port credits associated with the first port, the number of port credits being indicative of a free queue having fewer than a minimum threshold number of buffers, and
        means for using the number of queue credits and the number of port credits to regulate incoming data traffic to the first port; and
    means for outputting data from specific ones of the VOQs, based on a set of quality of service (QoS) criteria, for transmission to a second port within the network switching device.

14. An apparatus as recited in claim 13, further comprising means for dynamically allocating memory to each of the plurality of VOQs on an as-needed basis.

15. An apparatus as recited in claim 14, further comprising:
    means for associating the data output from the VOQs with QoS related metadata;
    means for transmitting the data output from the VOQs and the associated metadata into a switching fabric within the network switching device, for transmission to the second port within the network switching device; and
    means for transmitting the data from the second port to a device which is external to the network switching device.

16. An apparatus as recited in claim 13, wherein the data received at the first port is in a connectionless format.

17. A method comprising:
    receiving data at a first port of a network switching device;
    queuing the received data into a plurality of virtual output queues (VOQs) in an ingress memory system of the network switching device;
    using a buffer-to-buffer credit scheme to regulate ingress of data at the first port, based on an amount of memory used by the VOQs, including
        dynamically tracking and updating a number of queue credits associated with the first port, the number of queue credits being indicative of one or more of the VOQs using more than a maximum threshold number of buffers,
        dynamically tracking and updating a number of port credits associated with the first port, the number of port credits being indicative of a free queue having fewer than a minimum threshold number of buffers, and
        using the number of queue credits and the number of port credits to regulate incoming data traffic to the first port; and
    outputting data from specific ones of the VOQs, based on a set of quality of service (QoS) criteria, for transmission to a second port within the network switching device.

18. A method comprising:
    receiving data at a first port of a network switching device;
    using a buffer-to-buffer credit scheme to regulate ingress of data at the first port, based on an amount of memory used by a plurality of virtual output queues (VOQs) associated with the first port in an ingress memory system of the network switching device, including
        dynamically tracking and updating a number of queue credits associated with the first port, the number of queue credits being indicative of one or more of the VOQs using more than a maximum threshold number of buffers,
        dynamically tracking and updating a number of port credits associated with the first port, the number of port credits being indicative of a free queue having fewer than a minimum threshold number of buffers, wherein the free queue is associated with the first port, and using the number of queue credits and the number of port credits to regulate incoming data traffic to the network switching device at the first port.

19. A method as recited in claim 18, further comprising outputting data from specific ones of the VOQs, based on a set of quality of service (QoS) criteria, for transmission to a second port within the network switching device.

20. A method as recited in claim 19, further comprising adding QoS related metadata to the data output from specific ones of the VOQs.

21. A method as recited in claim 20, further comprising transmitting the data output from specific ones of the VOQs with the QOS related metadata through a switching fabric within the network switching device, to a second port of the network switching device.

22. A method as recited in claim 21, further comprising, at the second port, removing the QoS related metadata from the data transmitted through the switching fabric, prior to transmitting the data from the second port to the device which is external to the network switching device.

23. A method as recited in claim 22, wherein the data received at the first port is in a connectionless format.

* * * * *